US00RE46009E

(19) United States
(12) Reissued Patent
Groom et al.

(10) Patent Number: US RE46,009 E
(45) Date of Reissued Patent: May 24, 2016

(54) FUEL-DISPENSING NOZZLE INHIBITOR

(71) Applicant: Stant USA Corp., Connersville, IN (US)

(72) Inventors: J Bradley Groom, Oxford, OH (US); Lowell R Bell, Fountaintown, IN (US)

(73) Assignee: Stant USA Corp., Connersville, IN (US)

(21) Appl. No.: 13/930,960

(22) Filed: Jun. 28, 2013

Related U.S. Patent Documents

Reissue of:
(64) Patent No.: 7,967,041
Issued: Jun. 28, 2011
Appl. No.: 12/172,874
Filed: Jul. 14, 2008

U.S. Applications:
(60) Provisional application No. 60/950,764, filed on Jul. 19, 2007.

(51) Int. Cl.
*B65B 3/00* (2006.01)
*B60K 15/04* (2006.01)

(52) U.S. Cl.
CPC ..... *B60K 15/04* (2013.01); *B60K 2015/0483* (2013.01)

(58) Field of Classification Search
CPC ..... B60K 15/04; B60K 2015/0483
USPC ..... 141/346, 286, 348–350, 363, 367; 251/149.1, 149.2
See application file for complete search history.

(56) References Cited

U.S. PATENT DOCUMENTS

| | | | |
|---|---|---|---|
| 3,730,216 | A | 5/1973 | Arnett et al. |
| 4,034,784 | A | 7/1977 | Ball et al. |
| 4,248,279 | A | 2/1981 | Warmbold |
| 4,687,034 | A | 8/1987 | Graiff et al. |
| 5,212,864 | A | 5/1993 | Bates et al. |
| 5,322,100 | A | 6/1994 | Buechler et al. |
| 5,385,179 | A | 1/1995 | Bates et al. |
| 5,439,129 | A | 8/1995 | Buechler |
| 5,738,359 | A | 4/1998 | Gundy |
| 6,152,455 | A | 11/2000 | Brockway et al. |
| 6,302,169 | B1 | 10/2001 | Pulos |
| 6,325,233 | B1 | 12/2001 | Harris |
| 6,382,270 | B1 | 5/2002 | Gzik |
| 6,539,990 | B1 | 4/2003 | Levey et al. |
| 6,607,014 | B2 | 8/2003 | Webb |
| 6,923,224 | B1 | 8/2005 | McClung et al. |

(Continued)

FOREIGN PATENT DOCUMENTS

| | | |
|---|---|---|
| DE | 4039269 | 2/1992 |
| DE | 10139665 | 2/2003 |

(Continued)

OTHER PUBLICATIONS

International Search Report for PCT International Application Serial No. PCT/US2008/069926, completed Dec. 15, 2008.

(Continued)

*Primary Examiner* — Joseph Kaufman
(74) *Attorney, Agent, or Firm* — Barnes & Thornburg LLP

(57) ABSTRACT

A nozzle inhibitor is included in a fuel tank filler neck closure assembly. The nozzle inhibitor blocks full insertion of a small-diameter unleaded fuel nozzle into the filler neck closure assembly yet allows full insertion of a large-diameter diesel fuel nozzle into the filler neck closure assembly.

98 Claims, 13 Drawing Sheets

(56) References Cited

U.S. PATENT DOCUMENTS

| | | | | |
|---|---|---|---|---|
| 6,968,874 | B1 | 11/2005 | Gabbey et al. | |
| 7,077,178 | B2 | 7/2006 | Hedevang | |
| 7,182,111 | B2 | 2/2007 | McClung et al. | |
| 7,293,586 | B2 | 11/2007 | Groom et al. | |
| 7,302,977 | B2 | 12/2007 | King et al. | |
| 7,665,493 | B2 * | 2/2010 | Groom et al. | 141/350 |
| 7,950,425 | B2 | 5/2011 | Och | |
| 2002/0020465 | A1 | 2/2002 | Gzik | |
| 2002/0170622 | A1 | 11/2002 | Webb | |
| 2004/0025967 | A1 | 2/2004 | Henry | |
| 2005/0000592 | A1 | 1/2005 | Bartlett | |
| 2006/0096662 | A1 * | 5/2006 | King et al. | 141/367 |
| 2006/0289084 | A1 | 12/2006 | Groom et al. | |
| 2007/0000574 | A1 | 1/2007 | DeCapua et al. | |
| 2007/0034287 | A1 | 2/2007 | Groom et al. | |
| 2008/0178962 | A1 * | 7/2008 | Baudoux et al. | 141/350 |
| 2010/0132838 | A1 * | 6/2010 | Cisternino et al. | 141/349 |
| 2010/0218849 | A1 * | 9/2010 | Hagano | 141/350 |

FOREIGN PATENT DOCUMENTS

| | | |
|---|---|---|
| DE | 10157090 | 4/2003 |
| DE | 102004002994 | 9/2005 |
| EP | 1319545 | 12/2001 |
| EP | 1284212 | 2/2002 |
| EP | 1262355 | 4/2002 |
| EP | 1555154 | 8/2004 |
| FR | 2762807 | 4/1994 |
| FR | 274014 | 11/1995 |
| FR | 2741014 | 11/1995 |
| FR | 2761934 | 4/1997 |
| FR | 2762807 | 4/1997 |
| GB | 2230765 | 10/1990 |
| JP | 1020070012663 | 1/2007 |
| JP | 2007261492 | 10/2007 |
| JP | 02009096215 | 5/2009 |
| KR | 1020070012633 | 1/2007 |
| WO | 9400351 | 1/1994 |
| WO | 2005077698 | 8/2005 |
| WO | 2010026502 | 3/2010 |

OTHER PUBLICATIONS

European Search Report for EP06250718 dated Oct. 4, 2006.

* cited by examiner

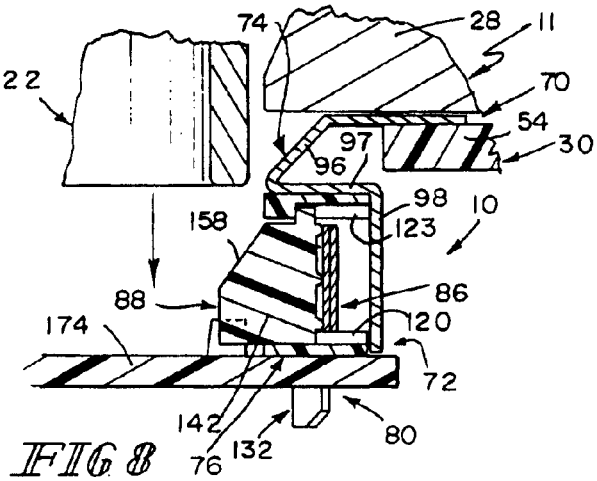
FIG 8
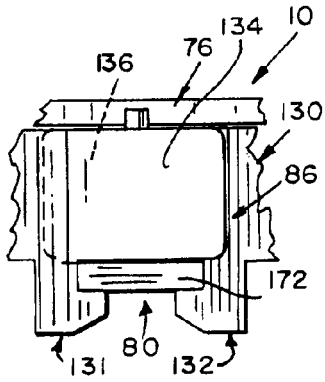
FIG 9
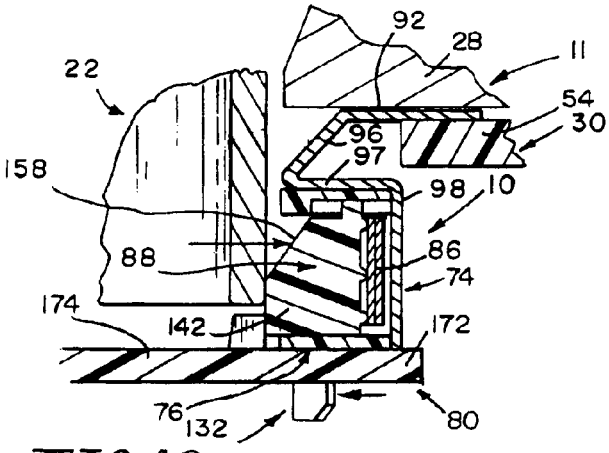
FIG 10
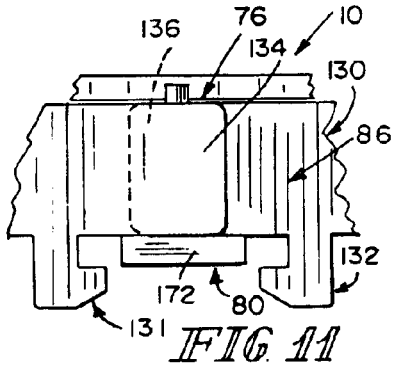
FIG 11
FIG 12
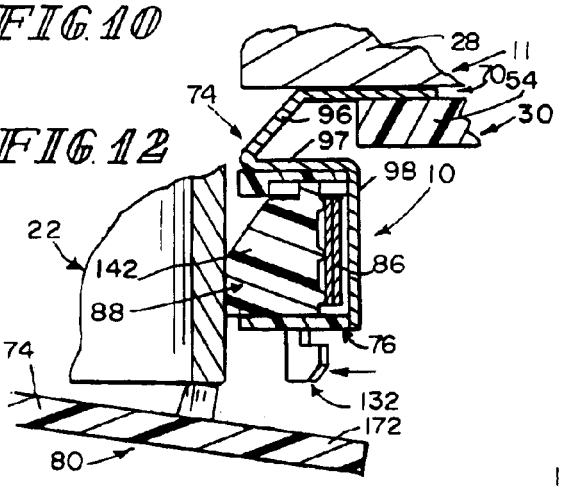
FIG 13
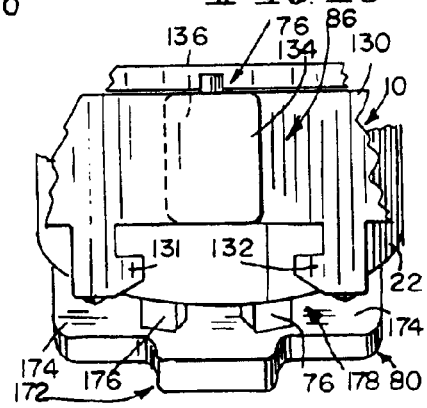

RETAINER BAND
FILLER NECK
FUEL TANK

FUEL-DISPENSING NOZZLE INHIBITOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims priority under 35 U.S.C. §119(e) to U.S. Provisional Application Ser. No. 60/950,764, filed Jul. 19, 2007, which is expressly incorporated by reference herein.

BACKGROUND

The present disclosure relates to a fuel tank fill tube, and more particularly to a device for preventing the introduction of a nozzle for unleaded fuel into the fill tube of a fuel tank of a motor vehicle fitted with a diesel internal combustion engine.

Unleaded fuel should not be introduced into a fill tube of a motor vehicle powered by a diesel engine. It is customary to use a small-diameter fuel-dispensing nozzle (e.g., 21.5 mm or less) to dispense unleaded fuel into a fuel tank fill tube and to use a large-diameter fuel-dispensing nozzle (e.g., 23.5 mm or more) to dispense diesel and leaded fuel into a fuel tank fill tube.

SUMMARY

A nozzle inhibitor is configured to be coupled to a fuel tank fill tube and arranged to allow only a diesel fuel nozzle having an outer diameter that is greater than a specified minimum diameter to be inserted into the fill tube to a depth sufficient so that a user may dispense diesel fuel from that nozzle into a diesel fuel tank coupled to the fill tube. Such a nozzle inhibitor inhibits insertion of a small-diameter unleaded fuel nozzle into the fill tube of a diesel fuel tank, yet allows a large-diameter diesel fuel nozzle to be inserted into the fill tube of the diesel fuel tank.

In illustrative embodiments, the fill tube includes a filler neck coupled to the diesel fuel tank and a filler neck closure assembly coupled to the filler neck. The nozzle inhibitor is included in the filler neck closure assembly.

The nozzle inhibitor illustratively includes a flapper door lock comprising a variable-circumference band and a pair of door-motion blockers coupled to opposite ends of the band. The nozzle inhibitor also includes a lock opener located inside the variable-circumference band. In an alternative embodiment, a modified flapper door lock in accordance with the present disclosure also includes an upwardly extending retainer lug appended to a free end of each of the door-motion blockers.

Only a large-diameter (diesel) fuel-dispensing nozzle can actuate the lock opener in accordance with the present disclosure to expand the circumference of the variable-circumference band and to disengage the door-motion blockers from the flapper door to allow passage of the nozzle past an opened flapper door into a filler neck coupled to the fuel tank. In contrast, a relatively smaller small-diameter (unleaded) fuel-dispensing nozzle is not wide enough at the tip to spread apart arc-shaped band movers included in the lock opener to expand the circumference of the band in the flapper door lock and cause the door-motion blockers to disengage from the flapper door. As such, the door-motion blockers continue to engage a tongue included in the flapper door to retain the flapper door in a closed position blocking passage of the small-diameter nozzle through the filler neck closure assembly and admission of the small-diameter nozzle into the filler neck.

In illustrative embodiments, the nozzle inhibitor is supported for lateral floating movement in the fuel fill tube in response to lateral movement of an unauthorized small-diameter (unleaded) fuel-dispensing nozzle relative to the nozzle inhibitor while the nozzle is touching the nozzle inhibitor (e.g., the flapper door included in the nozzle inhibitor). Such lateral movement causes the nozzle inhibitor to move to an off-center position in the fuel fill tube without actuating the lock opener associated with the variable-circumference band included in the flapper door lock.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIGS. 8-13 comprise a series of sectional views that show how a large-diameter (diesel) fuel-dispensing nozzle expands the variable-circumference band of the flapper door lock to free the normally locked flapper door during insertion of the large-diameter (diesel) fuel-dispensing nozzle into the fuel tank filler neck during a tank refueling activity;

FIG. 8 is an enlarged sectional view taken along line 8-8 of FIG. 5;

FIG. 9 is an enlarged partial elevation view taken along line 9-9 of FIG. 5 showing the L-shaped first and second door-motion blockers of the flapper door lock in a drawn-together formation trapping a door tongue included in the flapper door therebetween to retain the flapper door affirmatively in the closed position;

FIG. 10 is an enlarged sectional view taken along line 10-10 of FIG. 7;

FIG. 11 is an enlarged partial elevation view taken along line 11-11 of FIG. 7 showing the L-shaped first and second door-motion blockers of the flapper door lock in a spread-apart formation to release a door tongue included in the flapper door to free the flapper door for pivotable movement about the axis of rotation toward an opened position as suggested in FIGS. 12 and 13;

FIG. 12 is a sectional view similar to FIGS. 10 and 12 showing movement of the released flapper door relative to the inhibitor housing toward an opened position;

FIG. 13 is a partial elevation view similar to FIGS. 9 and 11 showing the flapper door in the partly opened position shown in FIG. 12;

FIG. 21 is a sectional view taken along line 21-21 of FIG. 20;

FIG. 22 is a sectional view taken along line 22-22 of FIG. 21 showing the L-shaped first and second door-motion blockers of the flapper door lock in a drawn-together formation trapping a door tongue included in the flapper door therebetween to retain the flapper door affirmatively in the closed position;

FIG. 23 is a partial sectional view similar to FIG. 21 showing downward movement of the large-diameter (diesel) fuel-dispensing nozzle into the modified nozzle inhibitor of FIG. 19;

FIG. 24 is a sectional view taken along line 24-24 of FIG. 23 showing the L-shaped first and second door-motion blockers of the flapper door lock in a spread-apart formation to release a door tongue included in the flapper door to free the flapper door for pivotable movement about an axis of rotation toward an opened position as suggested in FIGS. 25 and 26;

FIG. 25 is a partial sectional view similar to FIGS. 21 and 23 showing movement of the released flapper door relative to the inhibitor housing toward an opened position;

FIG. 26 is a sectional view taken along line 26-26 of FIG. 25;

FIG. 27 is a sectional view taken along line 27-27 of FIG. 20 except that the downwardly moving nozzle shown partially in section in FIG. 27 is a small-diameter (unleaded) fuel-dispensing nozzle that is not authorized to unlock the flapper door lock;

FIG. 28 is a sectional view taken along line 28-28 of FIG. 27 showing that the underside of the door tongue included in the flapper door is formed to include a downwardly opening lug receiver channel and showing that a retainer lug is appended to the free end of each of the L-shaped first and second door-motion blockers of the modified flapper door lock and arranged to extend upwardly toward the overlying lug receiver channel;

FIG. 29 is a partial sectional view similar to FIG. 27 showing movement of the small-diameter (unleaded) fuel-dispensing nozzle in the direction of the double arrow to engage and move at least one of arc-shaped band movers located on the right-hand side of the nozzle inhibitors in a radially outward direction (to the right) in an unauthorized effort to unlock the flapper door lock;

FIG. 30 is a sectional view taken along line 30-30 of FIG. 29;

FIG. 31 is a partial sectional view similar to FIGS. 27 and 29 showing continued downward movement of the unauthorized small-diameter (unleaded) fuel-dispensing nozzle to engage the flapper door; and FIG. 32 is a sectional view taken along line 32-32 of FIG. 31 showing that the retainer lug appended to the free end of the first (left side) door-motion blocker (of the modified flapper door lock of FIGS. 19 and 19A) extends upwardly into the downwardly opening lug receiver channel formed in the door tongue of the flapper door in response to slight downward pivoting movement of the flapper door (as shown in FIG. 31) to interlock the door tongue and the retainer lug so as to block expansion of the variable-circumference band, separation of the first and second door-motion blockers coupled to opposite ends of the variable-circumference band, and release of the flapper door.

DETAILED DESCRIPTION

Figure 1:
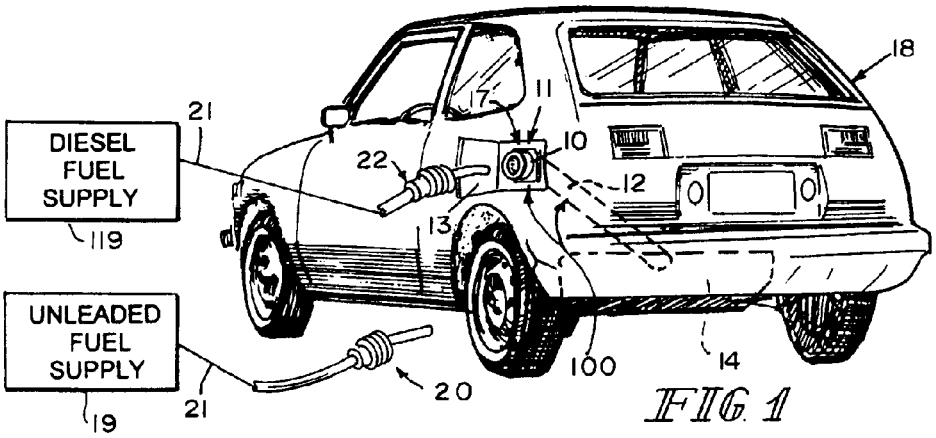
FIG. 1 is a perspective view of a diesel-engine vehicle provided with a capless fuel tank fill tube showing an outer filler neck access door moved to an opened position relative to a vehicle body panel to expose an illustrative capless filler neck closure assembly coupled to a filler neck (shown in phantom) leading to a vehicle fuel tank (also shown in phantom), showing a large-diameter (diesel) fuel-dispensing nozzle coupled to a diesel fuel supply and configured to be inserted into the filler neck closure assembly during vehicle refueling to discharge liquid diesel fuel into the filler neck leading to the vehicle fuel tank, and showing a small-diameter (unleaded) fuel-dispensing pump nozzle that is not authorized for use to refuel the diesel-engine vehicle fuel tank.

A nozzle inhibitor 10 is adapted to be mounted in a capless fill tube 100 as shown, for example, in FIGS. 1-3, 14, and 15 to block use of a small-diameter (unleaded) fuel-dispensing nozzle 20 to dispense non-diesel unleaded fuel into a fuel tank 14 of a diesel-engine vehicle 18. Nozzle inhibitor 10 is configured to allow a user to dispense diesel fuel into such a tank using a large-diameter (diesel) fuel-dispensing nozzle 22 as shown, for example, in FIGS. 4-7 and 8-13. Nozzle inhibitor 10 is also suitable for use in a traditional fill pipe closed by a fuel (gas) cap. Nozzle inhibitor 10 includes a flapper door lock 86 having a variable-circumference band 130 shown, in FIGS. 2 and 3A and used normally to lock a flapper door 80 in a closed position in fuel tank fill tube 100 as suggested in FIG. 3B and FIGS. 8 and 9. A modified flapper door lock 286 is included in an alternative nozzle inhibitor 210 as suggested in FIGS. 19-32.

A nozzle inhibitor 10 is associated with a capless fill tube 100 coupled to a vehicle fuel tank 14 as suggested in FIG. 1 to prevent a fuel-purchasing customer from using a fuel-dispensing pump nozzle to discharge unleaded fuel into a vehicle 18 having a diesel engine (not shown) requiring only diesel fuel. In an illustrative embodiment, fill tube 100 includes a filler neck closure assembly 11 coupled to a filler neck 12 that is coupled to fuel tank 14. Nozzle inhibitor 10 is configured to block full insertion of a small-diameter unleaded fuel nozzle 20 into filler neck 12 as suggested in FIGS. 4 and 5. However, nozzle inhibitor 10 is configured to allow full insertion of a relatively large-diameter diesel fuel nozzle 22 into filler neck 12 as suggested in FIGS. 9 and 10.

As shown in FIG. 1, a filler neck closure assembly 11 containing nozzle inhibitor 10 is provided in a vehicle 18 normally to close a filler neck 12 extending from fuel tank 14 onboard vehicle 18. During refueling, an outer filler neck access door 13 is moved relative to a vehicle body panel 15 to expose filler neck closure assembly 11 as shown, for example, in FIG. 1. Filler neck closure assembly 11 is located in a chamber 17 formed in vehicle 18 so that filler neck closure assembly 11 is out of sight when access door 13 is closed.

Small-diameter nozzle 20 is coupled to an unleaded fuel supply 19 by a hose 21. Large-diameter nozzle 22 is coupled to a diesel fuel supply 119 by another hose 21. In many cases, both nozzles 20, 22 will be available at a filling station. Nozzle inhibitor 10 in filler neck closure assembly 11 in vehicle 18 functions to block a consumer from inadvertently using small-diameter nozzle 20 to discharge unleaded fuel into a fuel tank filler neck of a vehicle that uses only diesel fuel.

Figure 2:
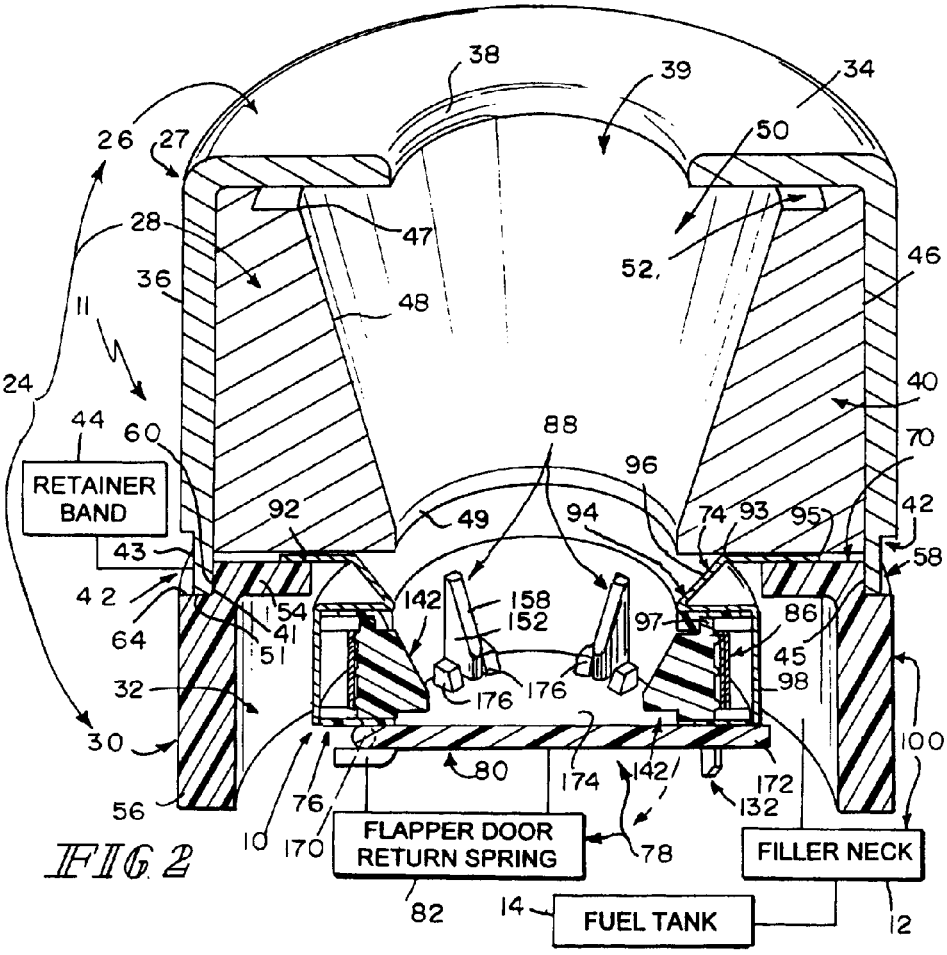
FIG. 2 is an enlarged partial perspective view of the filler neck closure assembly of FIG. 1 including an inhibitor housing coupled to a filler neck leading to the fuel tank and a nozzle inhibitor mounted for radially inward and outward floating movement in the inhibitor housing and showing that the inhibitor housing includes an interior block formed to include a funnel-shaped nozzle guide surface, an outer shell mounted on the interior block and formed to include a mouth opening into a nozzle-receiving passageway defined by the funnel-shaped nozzle guide surface, and a base coupled to the outer shell to define a flange-receiving space between the interior block and the base, and also showing that the nozzle inhibitor includes a nozzle conduit aligned with the nozzle-receiving passageway and configured to include an annular support flange arranged to extend into and float in radially inward and outward directions in the flange-receiving space, a closure including a spring-biased flapper door mounted for movement on the nozzle conduit between opened and closed positions, and a closure anchor coupled to the nozzle conduit and configured to retain the flapper door in the closed position until contacted by a large-diameter fuel-dispensing nozzle moving downwardly through a central opening formed in the closure anchor toward the flapper door as suggested, for example, in FIGS. 8-13.
Figure 3:
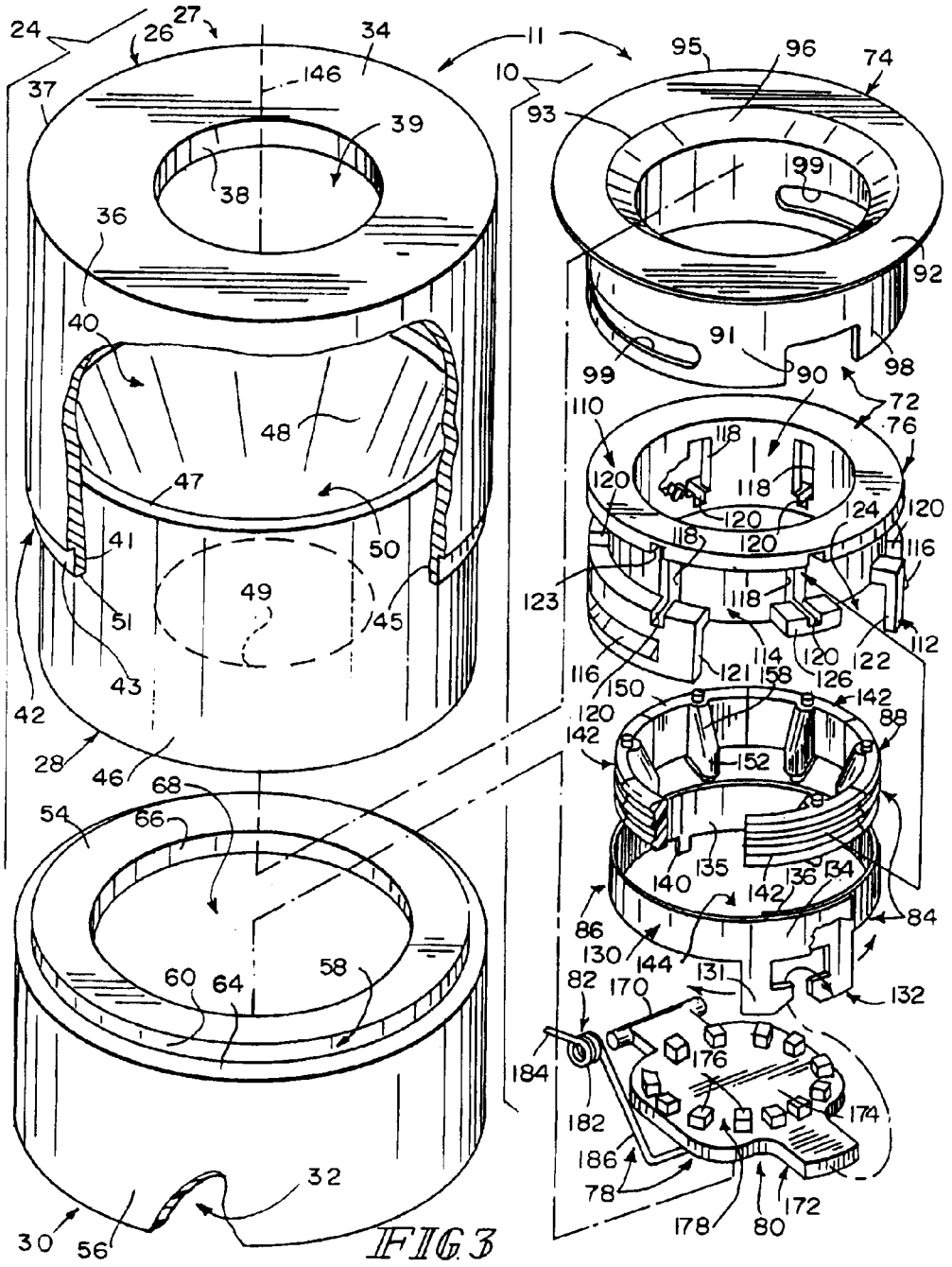
FIG. 3 is an exploded perspective assembly view of components included in the filler neck closure assembly shown in FIG. 2 showing that the inhibitor housing includes (in sequence from top to bottom on the left side of FIG. 3) an outer shell formed to include a nozzle-receiving mouth, an interior block arranged to extend upwardly into an interior region of the outer shell, and a base arranged to underlie the interior block and formed to include an interior region sized to house the nozzle inhibitor therein and showing that the nozzle inhibitor includes (in sequence from top to bottom on the right side of FIG. 3), a carrier shell included in the nozzle conduit and formed to include a radially outwardly extending floating support flange, a guide housing included in the nozzle conduit, a multi-part lock opener included in the closure anchor and defined by six separate arc-shaped band movers, a hoop-shaped flapper door lock included in the closure anchor and formed to include a variable-circumference band surrounding the band movers and a door latch including a first door-motion blocker coupled to the variable-circumference band and a second door-motion blocker also coupled to the variable-circumference band, and a closure lying under the closure anchor and including a pivotable flapper door and a flapper door return spring and showing that the pivotable flapper door includes a pivot mount, a door tongue, and a door plate arranged to interconnect the pivot mount and the door tongue and carry six pairs of upstanding band-mover guards.
Figure 14:
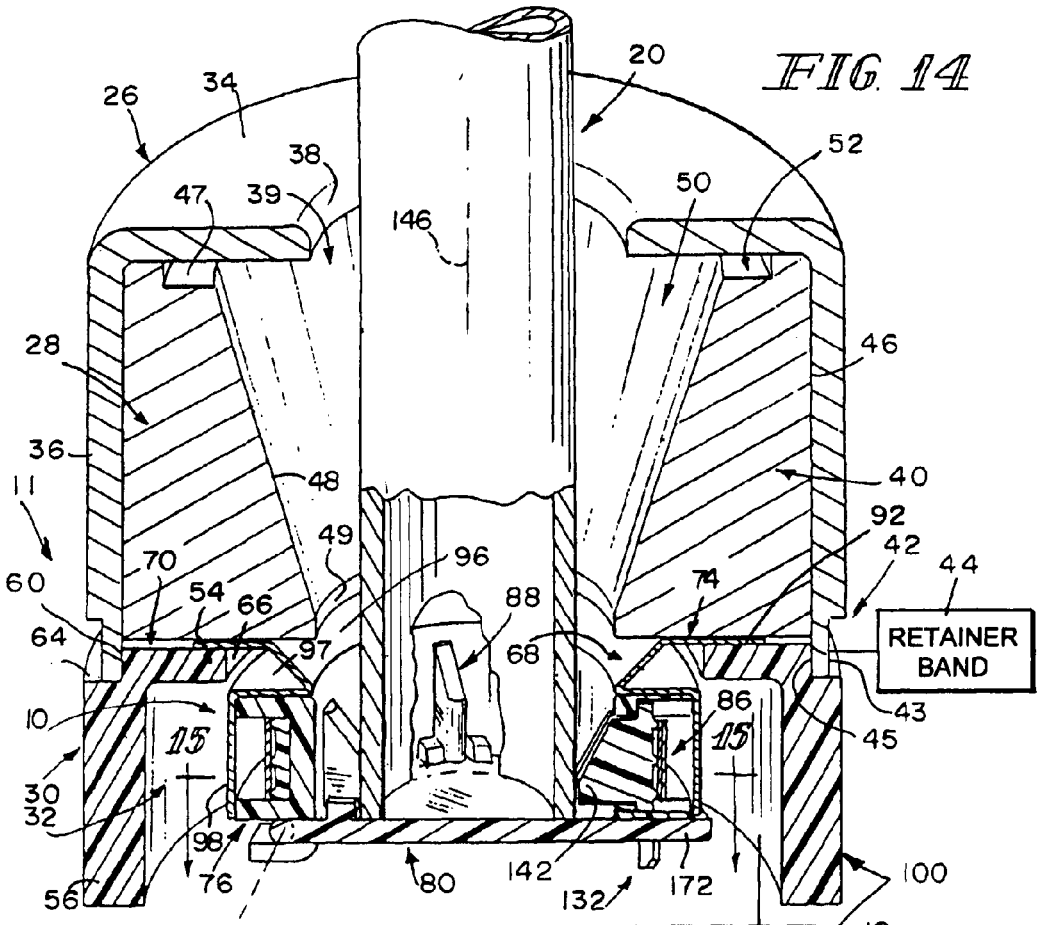
FIG. 14 is a partial perspective view similar to FIG. 2 of the filler neck closure assembly showing movement of an unauthorized small-diameter (unleaded) fuel-dispensing nozzle into the inhibitor housing and the nozzle inhibitor of FIGS. 2 to reach and contact the flapper door while the flapper door is retained in the closed position by mating engagement of the door-motion blockers of the flapper door lock and the door tongue of the flapper door.

As suggested in FIG. 3, filler neck closure assembly 11 includes a nozzle inhibitor 10 configured to include a minimal number of parts and an inhibitor housing 24 configured to support nozzle inhibitor 10 in communication with filler neck 12 as suggested in FIGS. 2 and 14. In illustrative embodiments, nozzle inhibitor 10 is mounted to float in radially outward and inward directions relative to inhibitor housing 24 as suggested in FIGS. 16-18 to defeat attempts by an operator to insert a small-diameter (unleaded) fuel-dispensing nozzle 20 through filler neck closure assembly 11 and into filler neck 12 of diesel-engine vehicle 18. Nozzle inhibitor 10 is configured to provide means for blocking admission of small-diameter nozzle 20 into filler neck 12 (as suggested in FIGS. 14 and 15) without blocking admission of large-diameter nozzle 22 into filler neck 12 (as suggested in FIGS. 8-13).

Inhibitor housing 24 includes an outer shell 26, an interior block 28, and a base 30 as suggested in FIG. 3. Outer shell 26 cooperates with interior block 28 to form a crown 27 coupled to base 30 as suggested in FIG. 16. Base 30 is configured to be coupled to an outer end of filler neck 12 as shown diagrammatically in FIG. 2. In illustrative embodiments, nozzle inhibitor 10 is mounted in a stable position in an interior region 32 formed in base 30 so that nozzle inhibitor 10 is constrained to lie in a fixed axial position in inhibitor housing 24 yet is free to float laterally relative to base 30 in inhibitor housing 24 without falling through aperture 68 formed in base 30 if an operator attempts to push or otherwise move components included in nozzle inhibitor 10 relative to inhibitor housing 24 with the tip of an unauthorized small-diameter nozzle 20 in an unauthorized attempt to defeat security features of nozzle inhibitor 10.

Outer shell 26 includes a top wall 34 and a cylinder-shaped side wall 36 depending from a round perimeter edge 37 of top wall 34 as shown in FIG. 3. Top wall 34 includes an interior edge 38 defining a mouth 39 opening into an interior region 40 of outer shell 26 bounded by top wall 34 and side wall 36. A lower end 42 of side wall 36 is formed to include a radially outwardly opening channel 43 sized to receive a retainer band 44 or any suitable retainer therein as suggested diagrammatically in FIG. 2.

Interior block 28 is formed includes a cylindrical outer wall 46, an axially outer large-diameter opening 47, an axially inner relatively small-diameter opening 49, and a funnel-shaped nozzle guide surface 48 arranged to extend from large-diameter opening 47 to small-diameter opening 49 as shown best in FIG. 2. Funnel-shaped nozzle guide surface 48 is configured to define an interior passageway 50 extending between openings 47 and 49. As suggested in FIGS. 2 and 3, interior block 28 is configured to extend upwardly into interior region 40 through a bottom opening 45 formed in lower end 42 of side wall 36 to cause mouth 39 formed in top wall 34 of outer shell 26 to open into interior passageway 50 formed in interior block 28. An annular channel 52 is formed in an upper portion of interior block 28 and arranged to surround large-diameter opening 47 and open upwardly toward the underside of top wall 34 of outer shell 26. Annular channel 52 is sized to house an O-ring seal (not shown) or other suitable seal means for establishing a sealed connection between interior block 28 and top wall 34.

Base 30 includes a top wall 54 and a cylindrical side wall 56 depending from an outer perimeter portion of top wall 54 as shown in FIGS. 2 and 3. Walls 54 and 56 cooperate to form boundaries of interior region 32 as shown best in FIG. 2. Top wall 54 is formed to include an interior edge 66 defining an aperture 68 opening into interior region 32 formed in base 30. An axially upwardly and radially outwardly opening annular channel 58 is formed on an exterior portion of base 30 at the intersection of top wall 54 and side wall 56 as suggested in FIGS. 2 and 3. A radially outwardly facing annular outer edge of top wall 54 of base 30 mates with a cylindrical inner surface 41 of lower end 42 of outer shell 26 when outer shell 26 is mounted on base 30 as shown in FIG. 2. An axially upwardly facing annular top edge 64 of side wall 56 of base 30 mates with a downwardly facing annular bottom edge 51 of lower end 42 of outer shell 26 when outer shell 26 is mounted on base 30 as shown in FIG. 2.

As suggested in FIG. 2, lower end 42 of outer shell 26 is inserted in annular channel 58 of base 30 after interior block 28 is lodged in interior region 40 formed in outer shell 26. This aligns mouth 39 of outer shell 26, interior passageway 50 of interior block 28, and aperture 68 of base 30 in fluid communication with one another as shown in FIG. 2 to allow nozzles 20 and 22 to extend therethrough. Retainer band 44 or other suitable means is provided to fix outer shell 26 in a stationary position on base 30 while trapping interior block 28 therebetween so that a laterally extending flange-receiving space 70 is formed between a bottom surface of interior block 28 and a top surface of base 30. In an illustrative embodiment, laterally extending flange-receiving flange 70 is formed between crown 27 and base 30 as suggested in FIG. 16. Flange-receiving space 70 is sized to receive a portion (e.g., support flange 92) of nozzle inhibitor 10 to provide means for allowing floating movement of nozzle inhibitor 10 relative to interior block 28 and base 30 during unauthorized attempts to use a small-diameter (unleaded) fuel-dispensing nozzle 20 to unlock a normally locked flapper door 80 provided in nozzle inhibitor 10 to regulate admission of fuel-dispensing nozzles (e.g., nozzles 20 and 22) through filler neck closure assembly 11 into filler neck 12 as shown, for example, in FIGS. 16-18.

As suggested in FIG. 3, nozzle inhibitor 10 includes a nozzle conduit 72 comprising a carrier shell 74 and a guide housing 76, a closure 78 comprising a flapper door 80 and a flapper door return spring 82, and a closure anchor 84 comprising a hoop-shaped flapper door lock 86 and a multi-part lock opener 88. Closure 78 is coupled to a bottom portion of guide housing 76 and is configured normally to close a nozzle-receiving passageway 90 formed in guide housing 76 as suggested in FIG. 2. Closure anchor 84 is mounted on guide housing 76 as suggested in FIGS. 2, 4, and 5 and configured to provide means for retaining flapper door 80 in a closed position relative to guide housing 76 to block admission of small-diameter (unleaded) fuel-dispensing nozzle 20 through nozzle-receiving passageway 90 into filler neck 12 as suggested in FIGS. 14 and 15 and for releasing flapper door 80 upon contact with a moving large-diameter (diesel) fuel-dispensing nozzle 22 so that flapper door 80 is moved by large-diameter nozzle 22 relative to guide housing 76 from the closed position to an opened position to allow passage of large-diameter nozzle 22 through nozzle-receiving passageway 90 into filler neck 12 as suggested in FIGS. 6-7 and 8-13. Carrier shell 74 includes a radially outwardly extending annular support flange 92 that is sized to fit into flange-receiving space 70 provided between interior block 28 and base 30 to support carrier shell 74, guide housing 76, closure 78, and closure anchor 84 in a selected axial position in interior region 32 of base 30 and to allow floating movement of nozzle inhibitor 10 in radially outward and inward directions relative to inhibitor housing 24 as suggested in FIGS. 16-18.

Carrier shell 74 includes a floating annular support flange 92 and a housing mount 94 coupled to an interior edge 93 of annular support flange 92 as suggested in FIGS. 2 and 3. Annular support flange 93 also includes a round exterior edge 95. Housing mount 94 is formed to include a funnel-shaped nozzle guide wall 96, an annular top wall 97, and an annular side wall 98 formed to include a door notch 91 and a pair of circumferentially spaced-apart lug-receiving slots 99. An outer edge of annular top wall 97 is appended to a top edge of annular side wall 98. Funnel-shaped nozzle guide wall 96 is arranged to interconnect an interior edge 93 of annular support flange 92 and an inner edge of annular top wall 97 and to converge in a direction extending from annular support flange 92 to annular top wall 97 as suggested in FIGS. 2 and 3.

An illustrative guide housing 76 is shown in FIG. 3 and includes an annular top wall 110, an outer rim 112, and an inner rim 114 arranged to interconnect outer rim 112 and annular top wall 110. Guide housing 76 also includes a pair of circumferentially spaced-apart curved lugs 116 arranged to extend in radially outward directions into lug-receiving slots 99 formed in annular side wall 98 of carrier shell 74 to fix guide housing 76 in a stationary mounted position in carrier shell 74 to establish a subassembly defining nozzle conduit 72.

Guide housing 76 is configured to include guide means for supporting components included in lock opener 88 for movement relative to guide housing 76 to operate flapper door lock 86 and cause flapper door 80 to be released and thus free to be moved from a closed position to an opened position. In an illustrative embodiment, inner rim 114 is formed to include six circumferentially spaced-apart head-receiving guide apertures 118 and has an internal diameter that is less than the internal diameter of outer rim 112. Outer rim 112 is formed to include five circumferentially spaced-apart lower guide slots 120 and each lower guide slot 120 is associated with only one of the head-receiving guide apertures 118 as suggested in FIG. 3. In the illustrated embodiment, outer rim 112 subtends an angle of about 270° and first and second ends 121, 122 of outer rim 112 are arranged to lie in spaced-apart relation to one another to define a finger-motion area 124 therebetween.

Guide housing 76 also includes a cantilevered platform 126 coupled to inner rim 114 at one of the head-receiving guide apertures 118 and arranged to extend radially outwardly away from inner rim 114 midway between first and second ends 121, 122 of outer rim 112 as shown in FIG. 3. Cantilevered platform 126 is formed to include a guide slot 120 associated with the head-receiving guide aperture 118 aligned with cantilevered platform 126. Annular top wall 110 is formed to include a downwardly opening upper guide slot 123 associated with each of the six head-receiving guide apertures 118 and arranged to lie in alignment with each of the six lower guide slots 120.

Figure 3A:
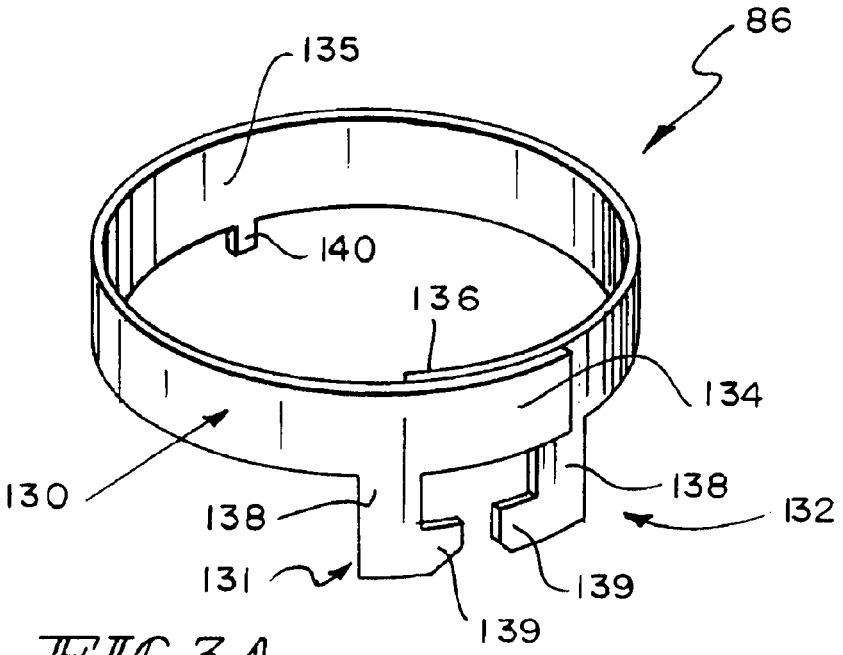
FIG. 3A is an enlarged perspective view of the hoop-shaped flapper door lock of FIG. 3 showing the variable-circumference band, a downwardly extending anti-rotation tab coupled to a middle portion of the variable-circumference band, a downwardly extending L-shaped first door-motion blocker coupled to a left-end portion of a curved strip defining the variable-circumference band, and a downwardly extending L-shaped second door-motion blocker coupled to a right-end portion of the curved strip that is arranged to lie in side-by-side sliding relation to the left-end portion of the curved strip.

Flapper door lock 86 is shown, for example, in FIGS. 3 and 3A. Flapper door lock 86 includes a variable-circumference band 130, a downwardly extending first door-motion blocker 131 coupled to a first end portion 134 of band 130, and a downwardly extending second door-motion blocker 132 coupled to an opposite second end portion 136 of band 130. In an illustrative embodiment, flapper door lock 86 is a monolithic element made of spring steel or other suitable elastic material and band 130 is defined by a curved strip having first and second end portions 134, 136. End portions 134, 136 are arranged to lie in side-by-side relation to one another as suggested in FIGS. 3 and 3A and to move relative to one another in, for example, mating and/or slip-sliding relation as suggested, for example, in FIGS. 4 and 6. Each door-motion blocker 121, 122 is L-shaped and includes a downwardly extending blade 138 cantilevered to band 130 and an inwardly extending latch finger 139 coupled to a free end of a companion blade 138 as suggested in FIG. 3A.

Figure 3B:
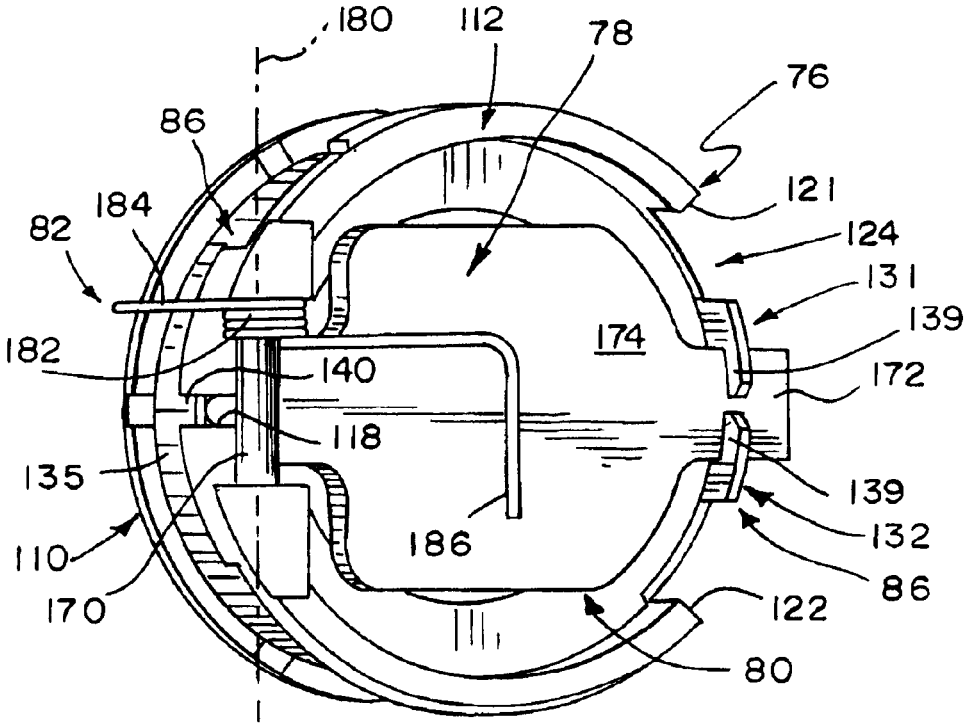
FIG. 3B is an inverted perspective view of a portion of the nozzle inhibitor of FIGS. 2 and 3 showing that the flapper door is mounted to the guide housing for pivotable movement about a pivot axis and the flapper door return spring is coupled to a pivot rod included in the flapper door and arranged to engage the guide housing and a door plate included in the flapper door to yieldably urge the flapper door normally to its closed position and showing that the anti-rotation tab of the flapper door lock is arranged to extend into a channel formed at a 9 o'clock position in the guide housing and the first and second door-motion blockers are arranged to lie in a drawn-together formation to restrain a door tongue included in the flapper door to block pivotable movement of the flapper door about the pivot axis from the closed position toward an opened position.

A downwardly extending anti-rotation tab 140 is coupled to a middle portion 135 of band 130 and arranged to extend into one of the lower guide slots 120 formed in guide housing 76 as suggested in FIG. 3B to limit rotation of band 130 about vertical axis 146 relative to guide housing 76 and to locate latch fingers 139 of first and second door-motion blockers 131, 132 in finger-motion area 124 formed in guide housing 76. The circumference (and diameter) of variable-circumference band 130 will vary (i.e., change) in response to movement of end portions 134, 136 relative to one another. This allows variable-circumference band 130 to shift back and forth between a normal narrow-diameter mode (wherein band 130 has a small circumference) shown, for example, in FIGS. 2, 3, 3A, 3B, 4, 5, 8, 9, and 14-18 and a radially outwardly expanded large-diameter mode (wherein band 130 has a relatively larger circumference) shown, for example, in FIGS. 6, 7, and 10-13.

Figure 5:
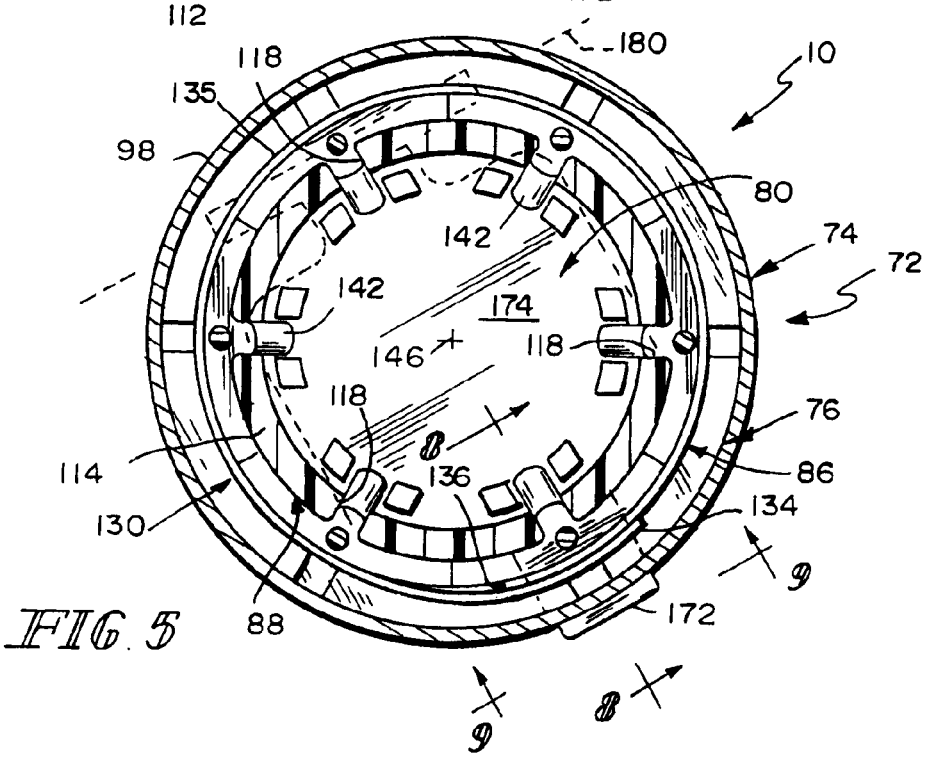
FIG. 5 is a transverse sectional view of the nozzle inhibitor taken along line 5-5 of FIG. 4 showing the variable-circumference band of the flapper door lock in a normal narrow-diameter mode surrounding the six arc-shaped band movers and showing that the radially inwardly extending push-head driver included in each arc-shaped band mover is arranged normally to extend through a channel formed between two companion upstanding band-mover guards.

Multi-part lock opener 88 is shown, for example, in FIG. 3 and, in an illustrative embodiment, comprises six separate arc-shaped band movers 142. Band movers 142 are arranged to lie in an interior region 144 formed inside variable-circumference band 130 as suggested in FIGS. 3, 5, and 7. Normally band 130 is coiled owing to elasticity of the spring material used to make band 130 to assume a narrow-diameter mode as shown in FIG. 5 to arrange band movers 142 in a packed relationship forming a circle and causing ends of adjacent band movers 142 to touch.

Figure 6:
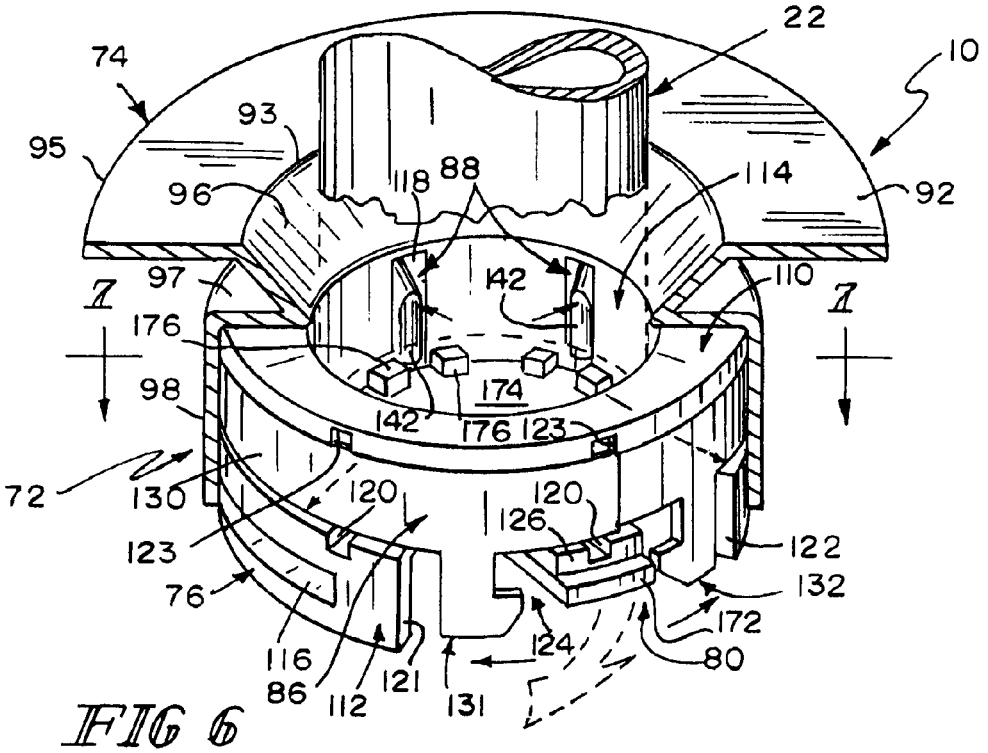
FIG. 6 is a perspective view similar to FIG. 4 after movement of the tip of the large-diameter (diesel) fuel-dispensing nozzle into a central opening formed in the nozzle inhibitor to contact the sloped ramps on the six arc-shaped band movers and urge the push-head drivers of the band movers to slide in radially outward directions to assume retracted positions in channels formed in the guide housing of the nozzle inhibitor.
Figure 7:
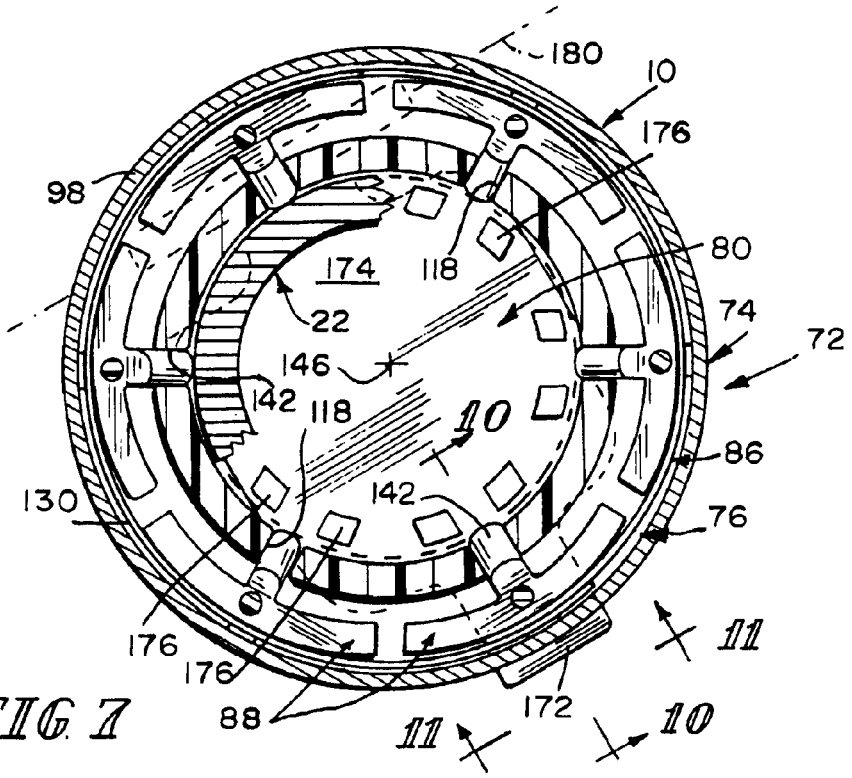
FIG. 7 is a transverse sectional view of the nozzle inhibitor taken along line 7-7 of FIG. 6 showing expansion of the variable-circumference band of the flapper door lock in an expanded large-diameter mode in response to radially outward movement of each of the six arc-shaped band movers caused by axially inward movement of the tip of the large-diameter (diesel) fuel-dispensing nozzle to reach the pivotable flapper door included in the closure of the nozzle inhibitor.

The outer diameter of small-diameter (unleaded) fuel-dispensing nozzle 20 is not large enough to contact all the band movers 142 of multi-part lock opener 88 and move them in radially outer directions to expand the circumference (and diameter) of variable-circumference band 130 and cause band 130 to assume the large-diameter mode shown in FIGS. 6 and 7 when small-diameter nozzle 20 is inserted into filler neck closure assembly 11. However, large-diameter (diesel) fuel-dispensing nozzle 22 has a relatively larger diameter and is able to spread arc-shaped band movers 142 away from a central axis 146 extending through flapper door lock 86 when large-diameter nozzle 22 is moved downwardly through nozzle-receiving passageway 90 formed in guide housing 76 toward flapper door 80 as suggested in FIGS. 8, 10, and 12. The spreading arc-shaped band movers 142 cooperate to expand the circumference (and diameter) of variable-circumference band 130 and move first and second door-motion blockers 131, 132 to assume a spread-apart formation releasing flapper door 80.

Figure 3C:
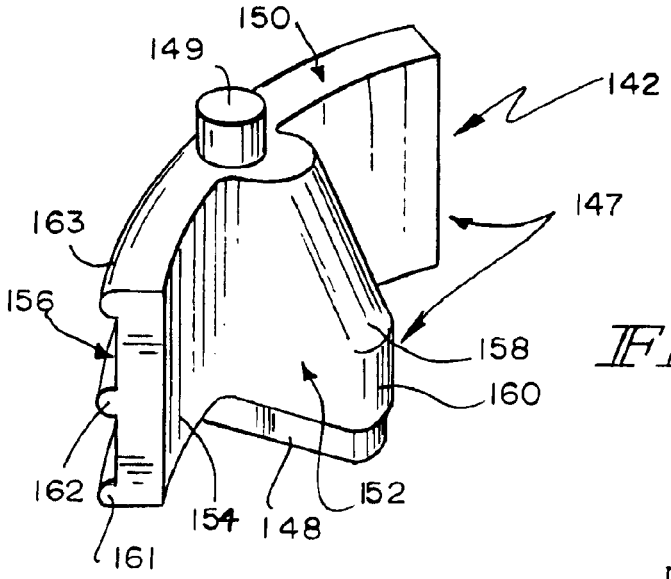
FIG. 3C is an enlarged perspective view of one of the arc-shaped band movers included in the multi-part lock opener shown in FIGS. 2 and 3 and showing that each band mover includes an actuator including a curved push head and a radially inwardly extending push-head driver coupled to a concave surface on the push head, an upper guide post coupled to the top of the actuator, and a lower guide post coupled to the bottom of the actuator.
Figure 3D:
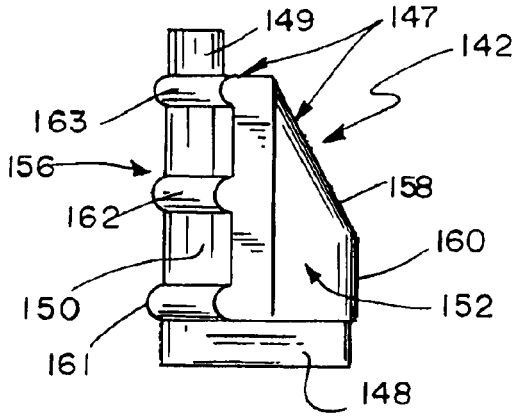
FIG. 3D is a left-side elevation view of the arc-shaped band mover of FIG. 3C showing that the push-head driver includes a sloped ramp arranged to engage the tip of a downwardly moving large-diameter (diesel) fuel-dispensing nozzle during movement of such a nozzle through the filler neck closure assembly as suggested, for example, in FIGS. 8, 10, and 12.
Figure 3E:
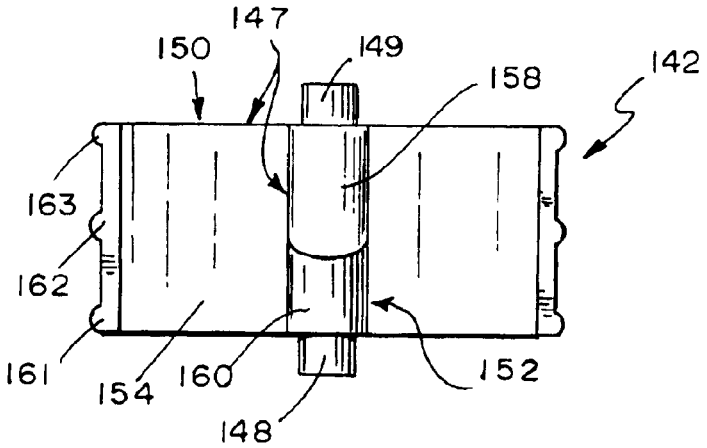
FIG. 3E is a front elevation view of the arc-shaped band mover of FIGS. 3C and 3D.

An illustrative band mover 142 is shown in FIGS. 3C, 3D, and 3E. Each band mover 142 includes an actuator 147, a lower guide post 148 coupled to the bottom of actuator 147, and an upper guide post 149 coupled to the top of actuator 147. Actuator 147 comprises a curved push head 150 and a radially inwardly extending push-head driver 152 coupled to a concave interior wall 154 of curved push head 150. A convex exterior wall 156 of curved push head 150 is formed to include three convex curved rails 161, 162, 163 sized and arranged to engage an interior surface of variable-circumference band 130. Push-head driver 152 includes a sloped ramp 158 shown in FIGS. 3C and 3D and arranged to provide means for engaging a tip of a downwardly moving large-diameter (diesel) fuel-dispensing nozzle 22 during movement of such a nozzle 22 through filler neck closure assembly 11 toward filler neck 12 as suggested in FIGS. 8, 10, and 12. Lower guide post 148 is elongated and oblong and arranged to extend in a radial direction along a bottom portion of curved push head 150 and oblong push-head driver 152 and slide back and forth in a companion lower guide slot 120. Upper guide post 149 is cylindrical and sized to fit into and slide back and forth in a companion upper guide slot 123. Push-head driver 152 is sized to fit into and slide back and forth in a companion head-receiving guide aperture 118 formed in guide housing 76. Push-head driver 152 also includes a forward face 160 extending downwardly from sloped ramp 158 toward lower guide post 148.

Flapper door 80 includes a pivot mount 170, a door tongue 172, and a door plate 174 arranged to interconnect pivot mount 170 and door tongue 172 as shown in FIG. 3. Flapper door 80 also includes six pairs of upstanding band-mover guards 176 as shown in FIG. 3. Each pair of band-mover guards 176 is formed to include a channel 178 therebetween arranged to receive a nose portion of push-head driver 152 as suggested in FIGS. 2, 4, and 5 when variable-circumference band 130 has assumed the narrow-diameter mode. Pivot mount 170 is coupled to guide housing 76 as suggested in FIG. 3B to establish a pivot axis 180. Door tongue 172 is arranged to extend through door notch 91 formed in carrier shell 74 to mate with first and second door-motion blockers 131, 132 normally to retain flapper door 80 in the closed position relative to guide housing 76 as shown, for example, in FIGS. 2, 4, and 5.

Flapper door return spring 82 includes a coiled portion 182 coupled to pivot mount 170 of flapper door 80, a first leg 184 arranged to engage guide housing 76, and a second leg 186 arranged to engage door plate 174 as suggested in FIG. 3B. Coiled portion 182 is arranged to interconnect first and second legs 184, 186. Return spring 82 is configured to provide means for yieldably moving flapper door 80 about pivot axis 180 normally to assume the closed position on guide housing 76 as shown, for example, in FIGS. 2 and 3B.

Flapper door 80 normally is held in its closed position by flapper door return spring 82. Anti-rotation tab 140 of hoop-shaped door lock 86 is arranged to extend into a channel 120 formed at a 9 o'clock position in guide housing 76 and first and second door-motion blockers 131, 132 are arranged to lie in a drawn-together formation as suggested in FIGS. 4 and 9 to mate with and restrain a door tongue 172 included in the flapper door 80 while flapper door 80 is urged by return spring 82 to assume the closed position to block pivotable movement of the flapper door 80 about pivot axis 180 from the closed position toward an opened position. Anti-rotation tab 140 is coupled to guide housing 76 to block an operator from using an unauthorized nozzle to pull on one door-motion blocker 131, 132 more than the other door-motion blocker 131, 132 in an attempt to unlock flapper door lock 86.

Figure 4:
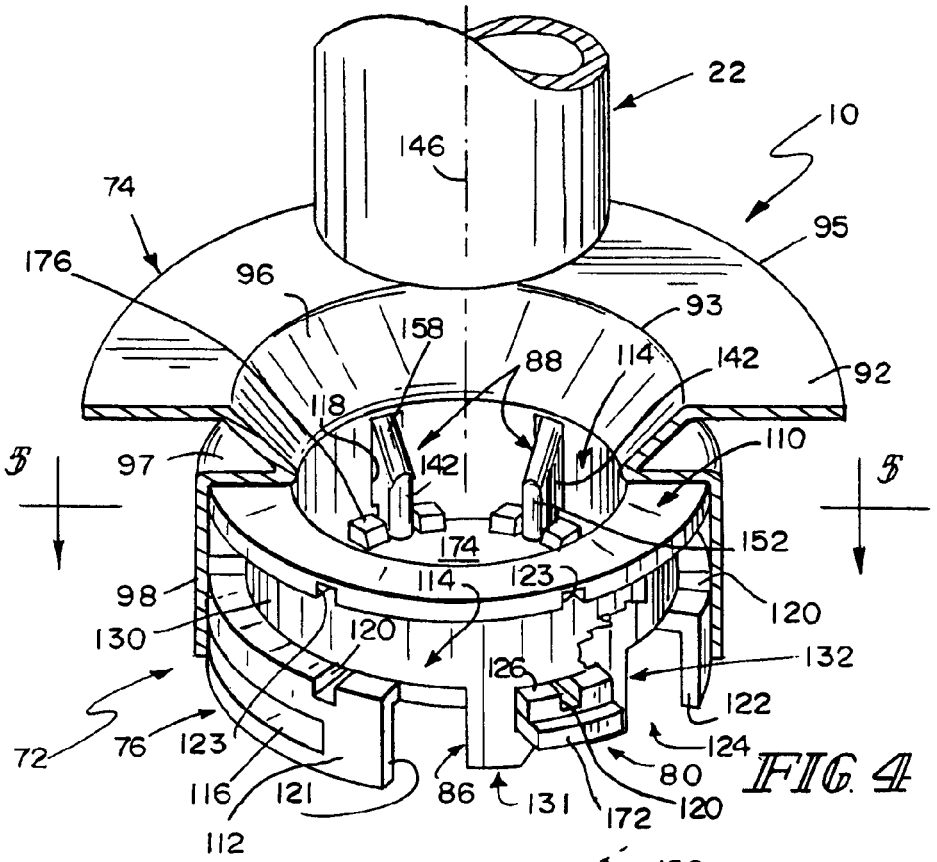
FIG. 4 is a perspective view of the nozzle inhibitor of FIGS. 2 and 3 and a tip of a large-diameter (diesel) fuel-dispensing nozzle above the nozzle inhibitor, with a portion of the carrier shell included in the nozzle conduit removed to show a sub-assembly comprising the guide housing, closure anchor, and closure, and showing retention of the pivotable flapper door in the closed position by the drawn-together first and second door-motion blockers included in the flapper door lock of the nozzle inhibitor.

As shown in FIG. 4, a tip of a large-diameter (diesel) fuel-dispensing nozzle 22 can be positioned above nozzle inhibitor 10 by a user. Pivotable flapper door 80 is retained in the closed position by the drawn-together first and second door-motion blockers 131, 132 included in flapper door lock 86 of nozzle inhibitor 10. Variable-circumference band 130 of flapper door lock 86 is shown in FIG. 5 in a normal narrow-diameter mode surrounding six arc-shaped band movers 142. Radially inwardly extending push-head driver 152 included in each arc-shaped band mover 130 is arranged normally to extend through a channel 178 formed between two companion upstanding band-mover guards 176.

After movement of the tip of large-diameter (diesel) fuel-dispensing nozzle 22 into a central opening formed in nozzle inhibitor 10, the tip of nozzle 22 contacts sloped ramps 158 on the six arc-shaped band movers 142 and urges push-head drivers 152 of band movers 142 to slide in radially outward directions to assume retracted positions in channels (i.e., head-receiving guide apertures 118) formed in guide housing 76 of nozzle inhibitor 10 as suggested in FIGS. 6 and 7. Resulting expansion of variable-circumference band 130 of flapper door lock 86 to assume an expanded large-diameter mode is shown in FIG. 7. Such expansion is effected in response to radially outward movement of each of the six arc-shaped band movers 142 caused by axially inward movement of the tip of the large-diameter (diesel) fuel-dispensing nozzle 22 to reach the pivotable flapper door 80 included in closure 84 of nozzle inhibitor 10.

L-shaped first and second door-motion blockers of flapper door lock 86 are aligned normally as shown in FIG. 4 in a drawn-together formation trapping a door tongue 172 included in flapper door 80 therebetween to retain flapper door 80 affirmatively in the closed position. The L-shaped first and second door-motion blockers 131, 132 of flapper door lock 86 are shown in FIG. 11 after they have been moved to assume a spread-apart formation to release door tongue 172 included in flapper door 80 to free flapper door 80 for pivotable movement about pivot axis 180 toward an opened position as suggested in FIGS. 12 and 13. Movement of the released flapper door 80 relative to inhibitor housing 24 toward an opened position is shown in FIG. 12.

Figure 15:
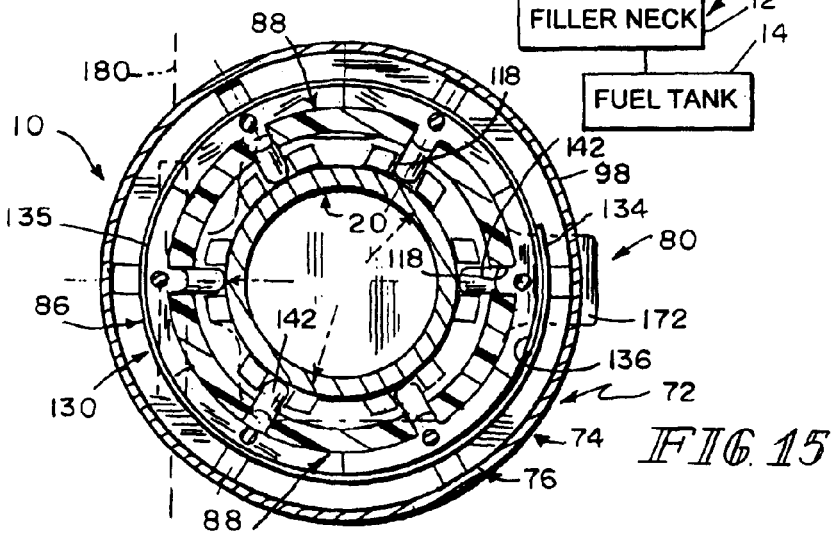
FIG. 15 is a transverse sectional view taken along line 15-15 of FIG. 14 showing the variable-circumference band of the flapper door lock in the normal narrow-diameter mode surrounding the six arc-shaped band movers to cause the L-shaped first and second door-motion blockers to remain in the drawn-together formation shown, for example, in FIG. 9 so that the flapper door is retained in the closed position and suggesting that the six pairs of upstanding band-mover guards are arranged on the door plate to block movement of the small-diameter (unleaded) fuel-dispensing nozzle to cause all of the arc-shaped band movers to move in radially outward directions to expand the circumference of the variable-circumference band and thus unlock the flapper door lock.

Movement of an unauthorized small-diameter (unleaded) fuel-dispensing nozzle 20 into inhibitor housing 24 and nozzle inhibitor 10 to reach and contact flapper door 80 while flapper door 80 is retained in the closed position by mating engagement of door-motion blockers 131, 132 of flapper door lock 86 and door tongue 172 of flapper door 80 is shown in FIG. 14. Variable-circumference band 130 of flapper door lock 86 is shown in FIG. 15 in the normal narrow-diameter mode surrounding six arc-shaped band movers 142 to cause the L-shaped first and second door-motion blockers 131, 132 to remain in the drawn-together formation shown, for example, in FIG. 9 so that flapper door 80 is retained in the closed position. The six pairs of upstanding band-mover guards 176 are arranged on door plate 174 to block movement of small-diameter (unleaded) fuel-dispensing nozzle 20 in the space formed in variable-circumference band 130 to cause all of arc-shaped band movers 142 to move in radially outward directions to expand the circumference of variable-circumference band 130 and thus unlock flapper door lock 86.

Figure 16:
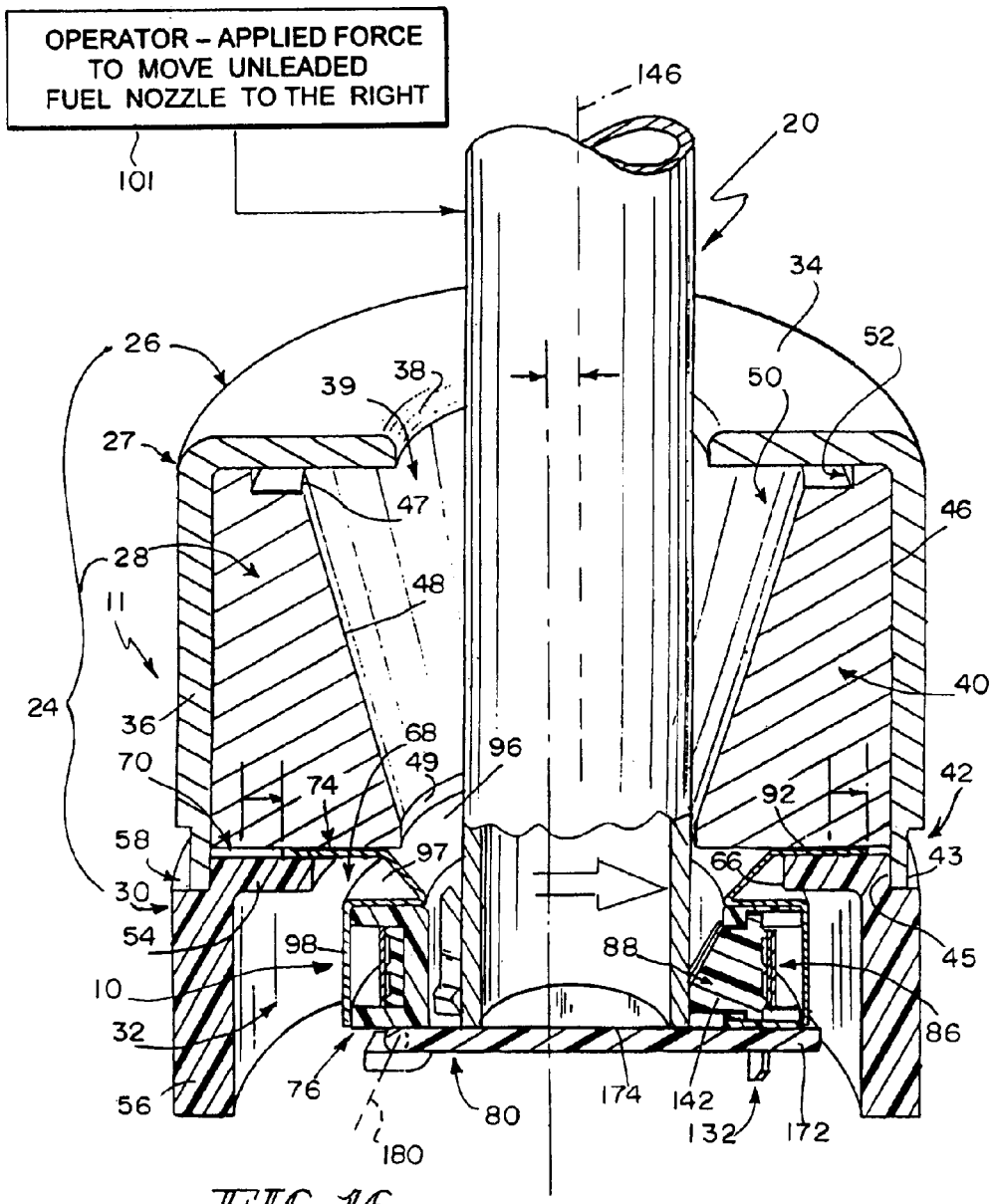
FIG. 16 is a view similar to FIG. 14 showing a first unsuccessful attempt to use an unauthorized small-diameter (unleaded) fuel-dispensing nozzle to actuate the lock opener to disable the flapper door lock in response to application of an operator-applied force to move the unauthorized small-diameter (unleaded) fuel-dispensing nozzle (to the right) relative to the nozzle inhibitor when the tip of that nozzle contacts an underlying doorplate of the flapper door as a result of floating movement of the annular support flange of the nozzle conduit of the nozzle inhibitor in the space provided above the base and below the interior block caused by lateral movement of the unauthorized small-diameter (unleaded) fuel-dispensing nozzle relative to the nozzle inhibitor against some of the upstanding band-mover guards appended to a top surface of a door plate included in the flapper door.

A first unsuccessful attempt to use an unauthorized small-diameter (unleaded) fuel-dispensing nozzle 20 to actuate lock opener 88 to disable flapper door lock 86 is shown in FIG. 16. An operator-applied force 101 is applied to move unauthorized small-diameter (unleaded) fuel-dispensing nozzle 20 (to the right) relative to nozzle inhibitor 10 when the tip of that nozzle 20 contacts an underlying door plate 174 of flapper door 80 and lies in a space surrounded by a ring of band-mover guards 176. Floating movement of annular support flange 92 of nozzle inhibitor 10 in the space 70 provided above base 30 and below interior block 28 is caused by lateral movement of the unauthorized small-diameter (unleaded) fuel-dispensing nozzle 176 relative to nozzle inhibitor 10 against some of the surrounding upstanding band-mover guards 176 appended to a top surface of a door plate 174 included in flapper door 80. Such lateral movement causes nozzle inhibitor 10 to move, for example, to an off-center position shown in FIG. 16 without causing any retracting motion of one of the arc-shaped band movers 142 into a companion guide aperture 118 formed in guide housing 76.

Figure 17:
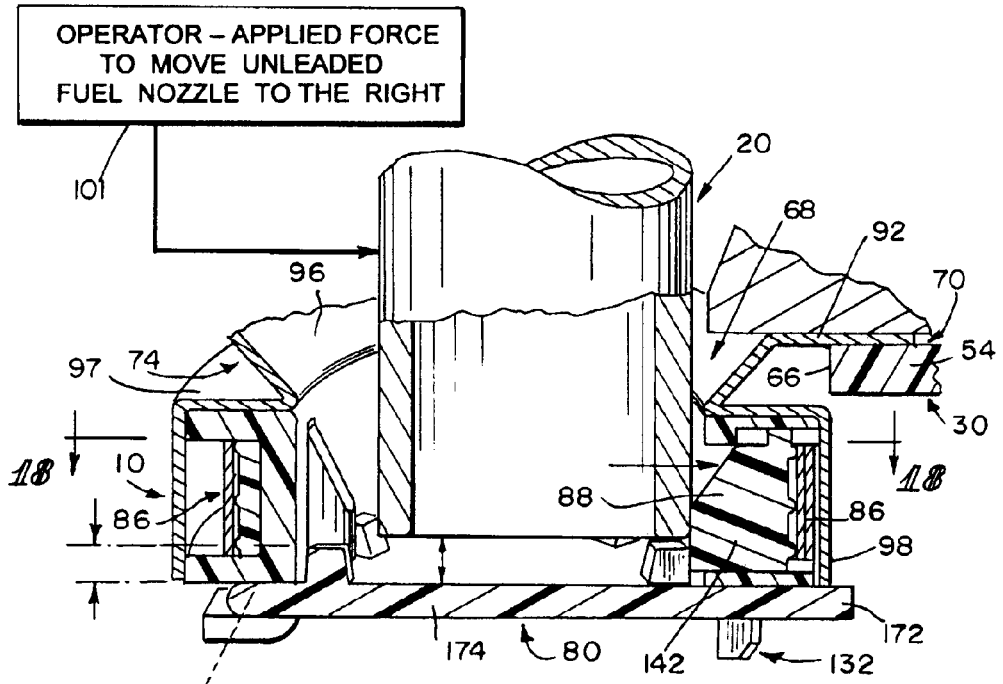
FIG. 17 is a view similar to FIG. 16 showing another unsuccessful attempt to use an unauthorized small-diameter (unleaded) fuel-dispensing nozzle to actuate the lock opener to disable the flapper door lock in response to application of an operator-applied force to move the unauthorized small-diameter (unleaded) fuel-dispensing nozzle laterally (to the right) relative to the nozzle inhibitor when the tip of that nozzle lies above the upstanding band-mover guards and in spaced-apart relation to the underlying door plate of the flapper door.
Figure 18:
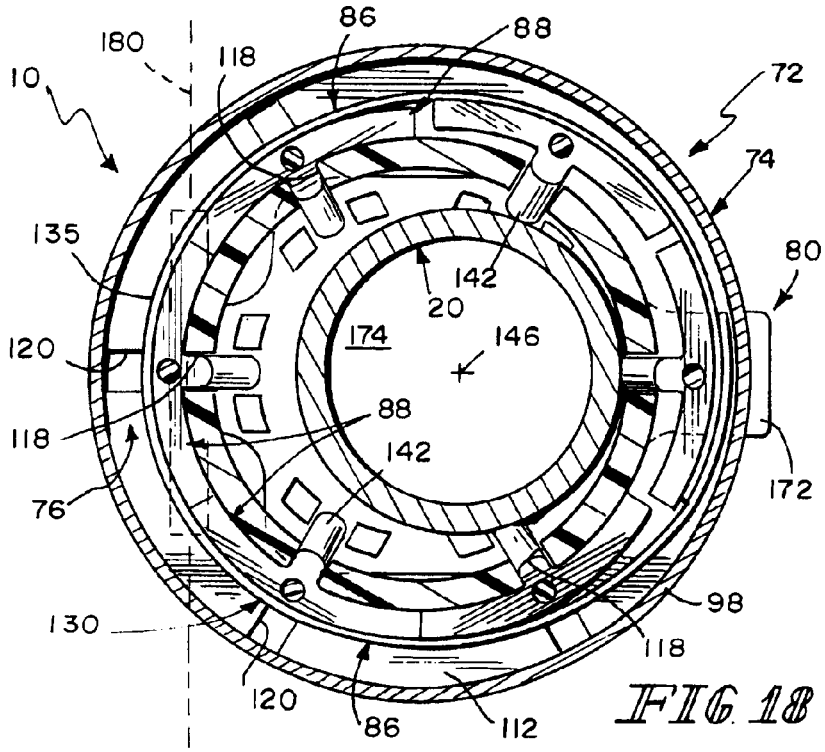
FIG. 18 is a transverse sectional view taken along line 18-18 of FIG. 17 showing shifting of the nozzle inhibitor from a normal centered position shown, for example, in FIG. 15 to assume a three o'clock position in response to the operator-applied force on the unauthorized fuel-dispensing nozzle owing to the freedom of the annular support flange included in the carrier shell of the nozzle conduit to float in the space provided between the base and the interior block of the inhibitor housing.

Another unsuccessful attempt to use an unauthorized small-diameter (unleaded) fuel-dispensing nozzle 20 to actuate lock opener 88 to disable flapper door lock 86 is shown in FIG. 17 in response to application of an operator-applied force 101 to move the unauthorized small-diameter (unleaded) fuel-dispensing nozzle 20 laterally (to the right) relative to nozzle inhibitor 10 when the tip of that nozzle 20 lies in a space above the ring of upstanding band-mover guards 176 and in spaced-apart relation to underlying door plate 174 of flapper door 80. Shifting of nozzle inhibitor 10 from a normal centered position shown, for example, in FIG. 15 to assume an off-center three o'clock position shown in FIG. 18 occurs in response to application of operator-applied force 101 on unauthorized fuel-dispensing nozzle 20 owing to the freedom of annular support flange 92 included in carrier shell 74 of nozzle conduit 72 to float in space 70 provided between base 30 and interior block 28 of inhibitor housing 24.

A nozzle inhibitor 210 in accordance with another embodiment of the present disclosure is shown in FIGS. 19-32. Nozzle inhibitor 210 includes a modified flapper door lock 286 shown, for example, in FIGS. 19, 19A, and 20. In all other respects, nozzle inhibitor 210 is similar in construction to nozzle inhibitor 10.

Flapper door lock 286 is shown in FIGS. 19-32. As suggested in FIGS. 19, 19A, and 20, flapper door lock 286 includes variable-circumference band 130, downwardly extending first door-motion blocker 131, downwardly extending second door-motion blocker 132, a first retainer lug 231 coupled to first door-motion blocker 131, and a second retainer lug 232 coupled to second door-motion blocker 132.

Figure 19:
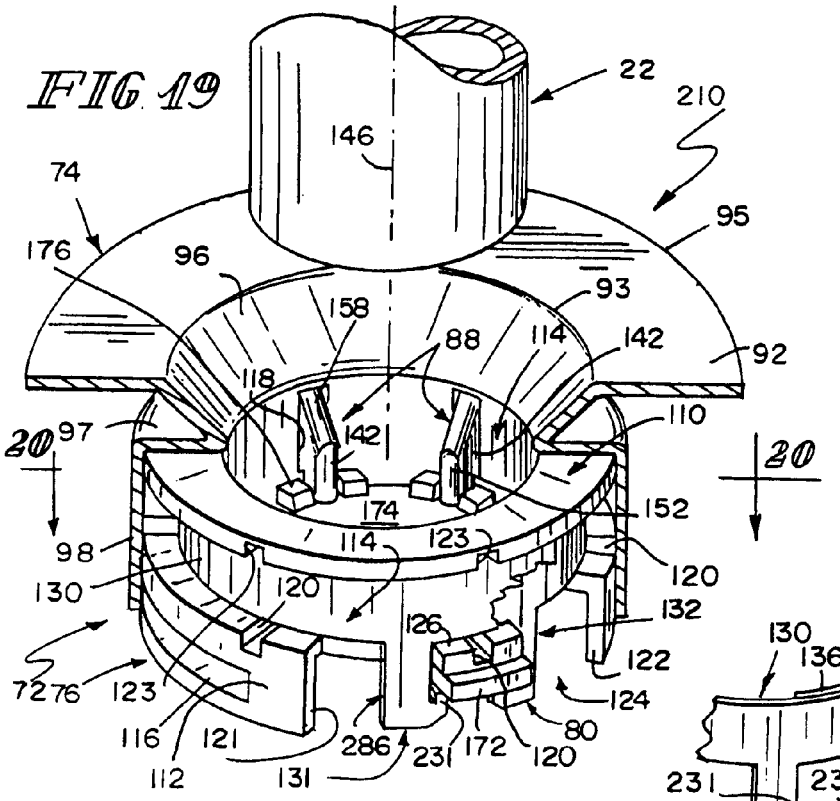
FIG. 19 is a perspective view (similar to FIG. 4) of a nozzle inhibitor including a flapper door lock modified as shown in FIGS. 19A and 28 to provide means on the door-motion blockers for interlocking with the flapper door (modified as shown in FIG. 28) when an unauthorized force is applied to the arc-shaped band movers using a small-diameter fuel-dispensing nozzle as suggested in FIGS. 28-32 affirmatively to retain the first and second door-motion blockers in a drawn-together formation so that the flapper door is retained in the closed position as suggested in FIGS. 31 and 32.
Figure 19A:
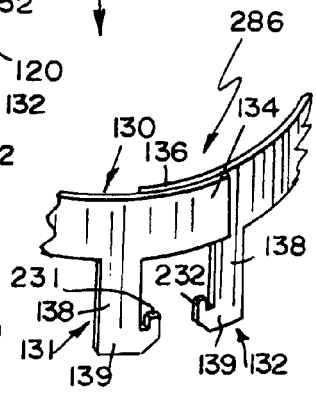
Figure 20:
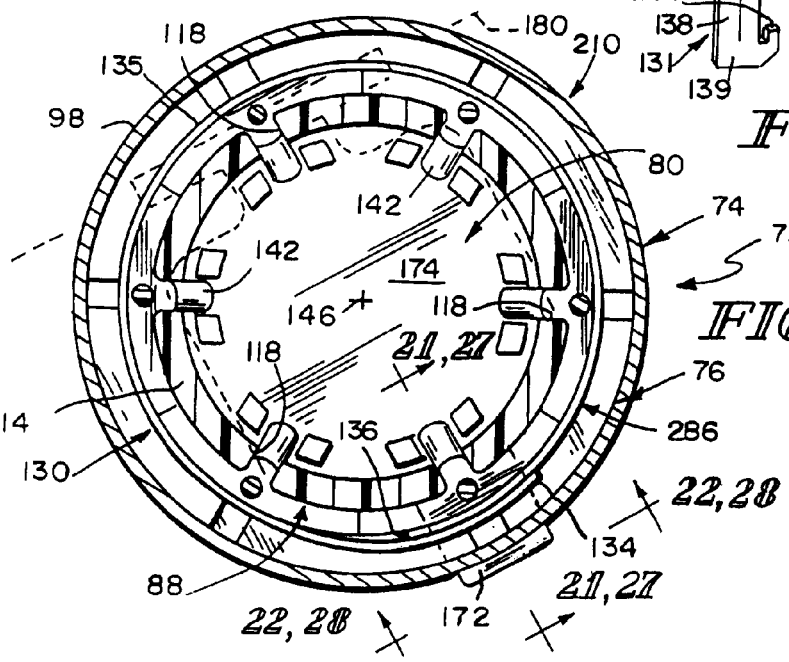
FIG. 20 is a transverse sectional view of the nozzle inhibitor taken along line 20-20 of FIG. 19.
Figure 21:
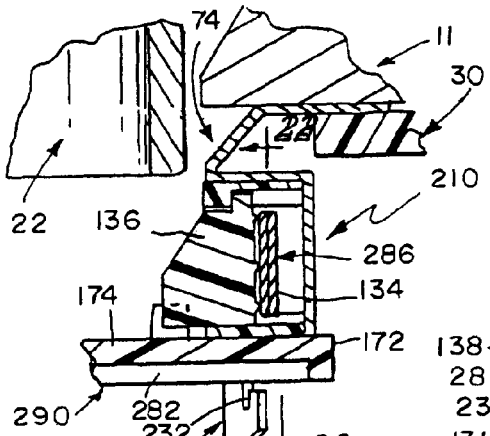
FIGS. 21-26 comprise a series of sectional views that show how a large-diameter (diesel) fuel-dispensing nozzle expands the modified flapper door lock of FIGS. 19 and 19A to free the normally locked flapper door during insertion of the large-diameter (diesel) fuel-dispensing nozzle into the fuel tank fill tube during a tank refueling activity.
Figure 22:
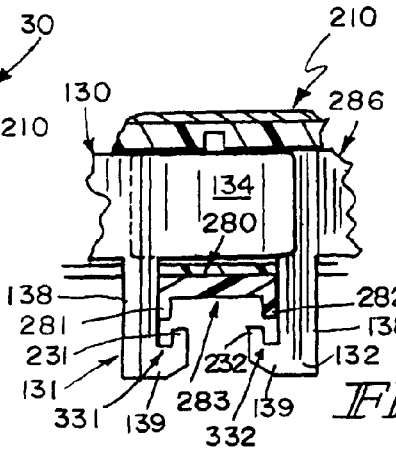
Figure 23:
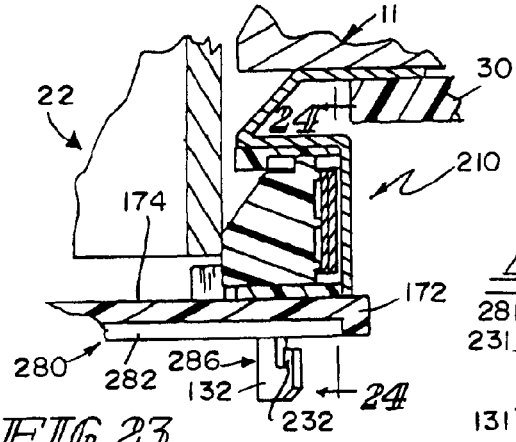
Figure 24:
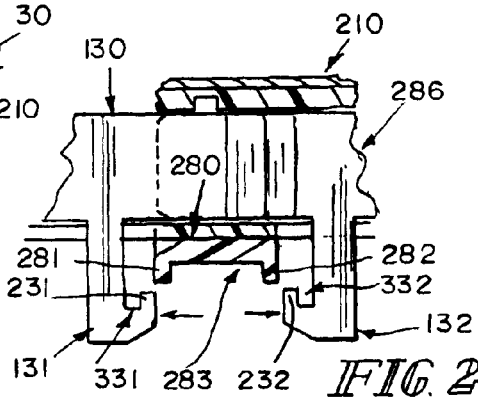
Figure 25:
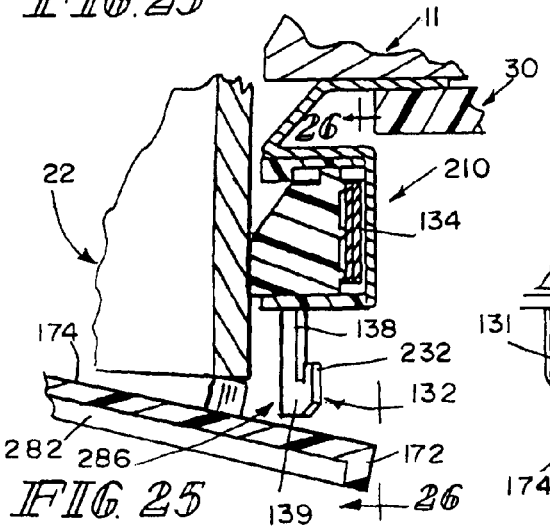
Figure 26:
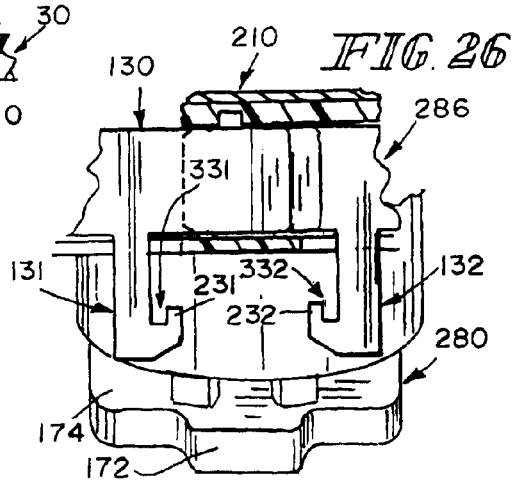
Figure 27:
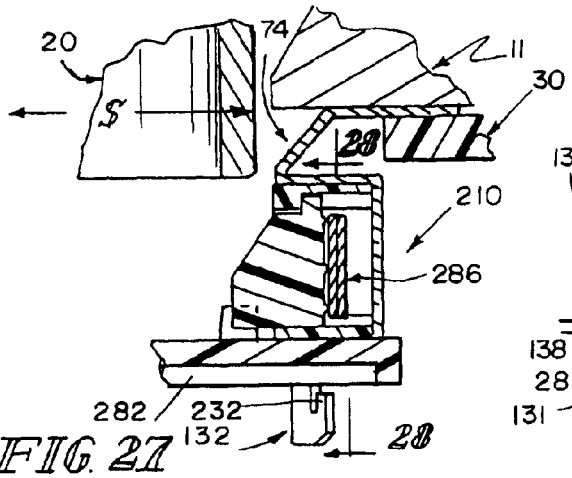
FIGS. 27-32 comprise a series of sectional views (similar to FIGS. 21-26) that show how the modified flapper door lock of FIGS. 19 and 19A functions to interlock with the flapper door to retain the flapper door in a closed position when a small-diameter (unleaded) fuel-dispensing nozzle is used in an unauthorized manner in an attempt to unlock the flapper door lock by expanding the circumference (diameter) of a variable-circumference band included in the flapper door lock.
Figure 28:
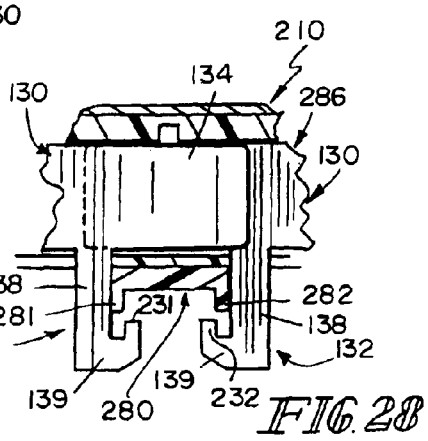
Figure 29:
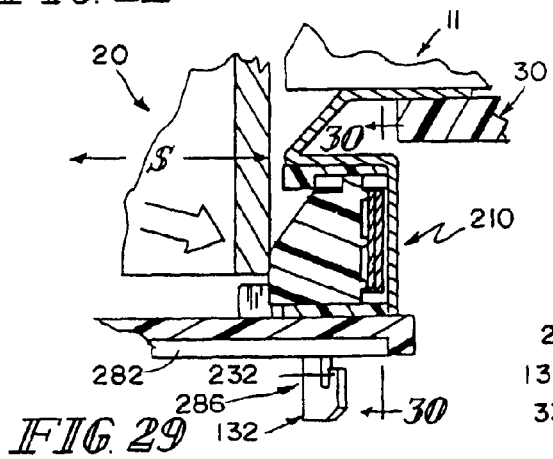
Figure 30:
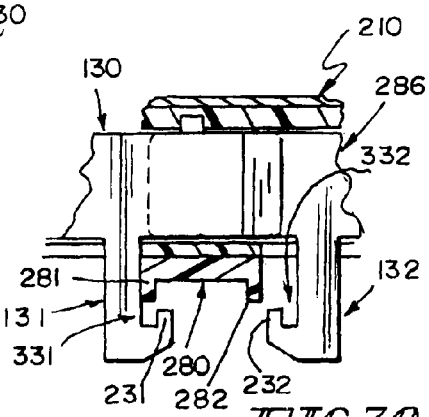

As shown in FIG. 19A, first retainer lug 231 is appended to a free end of inwardly extending latch finger 139 of first door-motion blocker 131. First retainer lug 231 is arranged to extend upwardly therefrom to lie in spaced-apart relation to downwardly extending blade 138 of first door-motion blocker 131 to define a first rail-receiving channel 331 therebetween.

As also shown in FIG. 19A, second retainer lug 232 is appended to a free end of inwardly extending latch finger 139 of second door-motion blocker 132. Second retainer lug 232 is arranged to extend upwardly therefrom to lie in spaced-apart relation to downwardly extending blade 138 of second door-motion blocker 132 to define a second rail-receiving channel 332 therebetween.

Nozzle inhibitor 210 includes a flapper door 280 that is similar to flapper door 80 except that it is formed to include a downwardly opening lug receiver channel 283 as shown, for example, in FIGS. 22, 24, 28, and 30. Each of retainer lugs 231, 232 is arranged to lie under and extend upwardly toward downwardly opening lug receiver channel 283 when flapper door 280 lies in a normally closed position in fill tube 100 as suggested in FIGS. 22, 24, 26, and 28. Flapper door 280 includes first and second rails 281, 282 a suggested in FIG. 28. Rails 281, 282 are arranged to lie in spaced-apart relation to one another to locate the downwardly opening lug receiver channel 283 therebetween.

Use of the tip of large-diameter (diesel) fuel-dispensing nozzle 22 to unlock modified flapper door lock 286 and open flapper door 280 is shown, for example, in FIGS. 21-26. Opening of flapper door 280 of nozzle inhibitor 210 using nozzle 22 is very similar to opening of flapper door 80 of nozzle inhibitor 10 shown in FIGS. 8-13.

Figure 31:
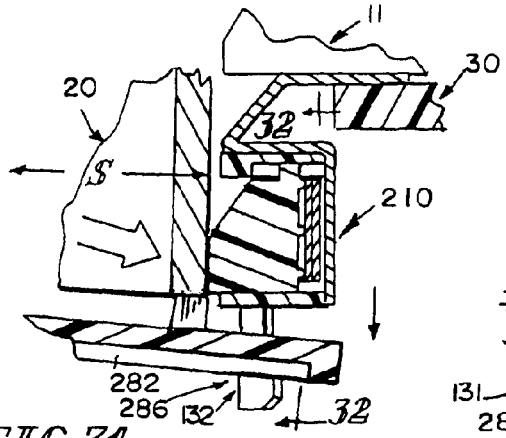
Figure 32:
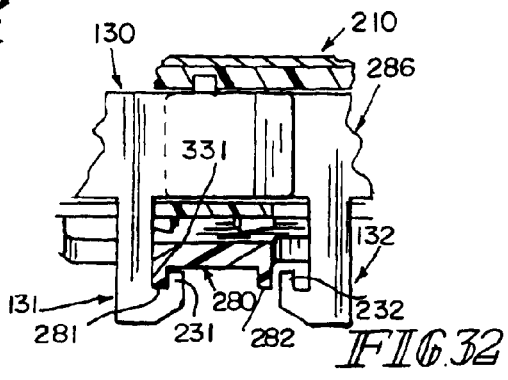

If an attempt is made by a consumer to open flapper door 280 of nozzle inhibitor 210 using an unauthorized small-diameter (unleaded) fuel-dispensing nozzle 20, then, as suggested in FIGS. 27-32, the downwardly moving nozzle 20 will push downwardly against flapper door 280 as suggested in FIG. 31 and cause flapper door lock 286 and flapper door 280 to interlock as suggested in FIG. 32. The interlocking connection between flapper door lock 286 and flapper door 280 is established when flapper door 280 moves relative to flapper door lock 286 to cause (1) first and second retainer lugs 281, 282 in flapper door lock 286 to extend upwardly into downwardly opening lug receiver channel 283 formed in flapper door 280 and/or (2) one of the first and second rails 281, 282 in flapper door 280 extends downwardly into a companion one of the rail-receiving channels 331, 332 formed in flapper door lock 286.

The invention claimed is:

1. A fuel-dispensing nozzle inhibitor comprising a nozzle conduit positionable on a fuel fill tube, wherein the fuel fill tube is constructed to direct fuel to a fuel tank, and wherein the nozzle conduit defines a nozzle-receiving passageway for receiving a fuel-dispensing nozzle with at least one of a first diameter selected for a first fuel type and a second diameter for a second fuel type, the second diameter being smaller than the first diameter, a closure positioned adjacent to a bottom portion of the nozzle conduit, wherein the closure has an opened position to permit insertion of the fuel-dispensing nozzle past the closure if the fuel-dispensing nozzle has the first diameter, and wherein the closure has a closed position to prevent insertion of the fuel-dispensing nozzle past the closure if the fuel-dispensing nozzle has the second diameter, a lock to retain the closure in a closed position if the fuel-dispensing nozzle has the second diameter and to release the closure if the fuel-dispensing nozzle has the first diameter, and lock opening means for actuating the lock, wherein the lock opening means is disposed within the nozzle conduit, wherein the lock opening means is adapted to contact the fuel-dispensing nozzle when inserted into the nozzle-receiving passageway, wherein the lock opening means cooperates with the lock to release the closure if the fuel-dispensing nozzle has the first diameter, and wherein the lock opening means cooperates with the lock to maintain the lock in the closed position if the fuel-dispensing nozzle has the second diameter, wherein the lock comprises a variable-circumference band, operable with the lock opening means and the closure, to bias the lock to retain the closure in the closed position and permit release of the closure if the fuel-dispensing nozzle has the first diameter.

2. The fuel-dispensing nozzle inhibitor of claim 1, wherein the closure comprises a flapper door pivotably disposed adjacent to the bottom portion of the nozzle conduit.

3. The fuel-dispensing nozzle inhibitor of claim 2, wherein the closure further includes a return spring that operates with the flapper door to bias the flapper door into the closed position and to permit the flapper door to be pushed into the opened position when the fuel-dispensing nozzle applies an opening force on the flapper door and a door tongue included in the flapper door, that cooperates with the lock such that the door tongue is retained in the lock when the flapper door is in the closed position and is released from the lock when the flapper door is in the opened position.

4. The fuel-dispensing nozzle inhibitor of claim 3, wherein the flapper door further includes a pivot mount and a door plate arranged to interconnect the pivot mount and the door tongue, the return spring has a coiled portion with a first leg engaging the nozzle conduit and a second leg engaging the pivot mount of the flapper door, and the door tongue is cantilevered to the door plate and arranged to extend in a direction away from the pivot mount.

5. The fuel-dispensing nozzle inhibitor of claim 1, wherein the lock opening means comprises separate band movers disposed in an annular arrangement within the nozzle conduit, the variable-circumference band comprises spring material that surrounds the band movers and comprises first and second blockers, the blockers engage the closure when in the closed position, and the blockers release the closure when in the opened position.

6. The fuel-dispensing nozzle inhibitor of claim 1, wherein the lock opening means includes push-head drivers and the push-head drivers are substantially, equidistantly spaced with respect to one another in the nozzle conduit.

7. The fuel-dispensing nozzle inhibitor of claim 6, wherein, to release the closure, a majority of the push head drivers must contact the fuel-dispensing nozzle.

8. The fuel-dispensing nozzle inhibitor of claim 7, wherein the majority of push head drivers comprises all of the push head drivers.

9. A fuel-dispensing nozzle inhibitor comprising a nozzle conduit positionable on a fuel fill tube, wherein the fuel fill tube is constructed to direct fuel to a fuel tank, and wherein the nozzle conduit defines a nozzle-receiving passageway for receiving a fuel-dispensing nozzle with at least one of a first diameter selected for a first fuel type and a second diameter for a second fuel type, the second diameter being smaller than the first diameter, a closure positioned adjacent to a bottom portion of the nozzle conduit, wherein the closure has an opened position to permit insertion of the fuel-dispensing nozzle past the closure if the fuel-dispensing nozzle has the first diameter, and wherein the closure has a closed position to prevent insertion of the fuel-dispensing nozzle past the closure if the fuel-dispensing nozzle has the second diameter, a lock to retain the closure in a closed position if the fuel-dispensing nozzle has the second diameter and to release the closure if the fuel-dispensing nozzle has the first diameter, and lock opening means for actuating the lock, wherein the lock opening means is disposed within the nozzle conduit, wherein the lock opening means is adapted to contact the fuel-dispensing nozzle when inserted into the nozzle-receiving passageway, wherein the lock opening means cooperates with the lock to release the closure if the fuel-dispensing nozzle has the first diameter, and wherein the lock opening means cooperates with the lock to maintain the lock in the closed position if the fuel-dispensing nozzle has the second diameter, wherein the lock opening means comprises actuators that comprise push heads and push-head drivers, the push heads contact one another and foam a circular ring when the lock locks the closure in the closed position, and the push-head drivers extend radially inwardly from an interior surface of the push heads and are adapted to contact a fuel-dispensing nozzle having the first diameter.

10. The fuel-dispensing nozzle inhibitor of claim 1, further comprising a guide housing disposed within the nozzle conduit to retain the lock opening means in radially slidable orientation with respect to the nozzle conduit.

11. A fuel-dispensing nozzle inhibitor comprising a nozzle conduit positionable on a fuel fill tube, wherein the fuel fill tube is constructed to direct fuel to a fuel tank, and wherein the nozzle conduit defines a nozzle-receiving passageway for receiving a fuel-dispensing nozzle with at least one of a first diameter selected for a first fuel type and a second diameter for a second fuel type, the second diameter being smaller than the first diameter, a closure positioned adjacent to a bottom portion of the nozzle conduit, wherein the closure has an opened position to permit insertion of the fuel-dispensing nozzle past the closure if the fuel-dispensing nozzle has the first diameter, and wherein the closure has a closed position to prevent insertion of the fuel-dispensing nozzle past the closure if the fuel-dispensing nozzle has the second diameter, a lock to retain the closure in a closed position if the fuel-dispensing nozzle has the second diameter and to release the closure if the fuel-dispensing nozzle has the first diameter, and lock opening means for actuating the lock, wherein the lock opening means is disposed within the nozzle conduit, wherein the lock opening means is adapted to contact the fuel-dispensing nozzle when inserted into the nozzle-receiving passageway, wherein the lock opening means cooperates with the lock to release the closure if the fuel-dispensing nozzle has the first diameter, and wherein the lock opening means cooperates with the lock to maintain the lock in the closed position if the fuel-dispensing nozzle has the second diameter, further comprising a guide housing disposed within the nozzle conduit to retain the lock opening means in radially slidable orientation with respect to the nozzle conduit, wherein the closure includes a flapper door including a door plate and a plurality of band-mover guards disposed on the door plate to engage the push heads when the closure is in the closed position.

12. The fuel-dispensing nozzle inhibitor of claim 9, wherein the lock comprises a variable-circumference band, operable with the lock opening means and the closure, to bias the lock to retain the closure in the closed position and permit release of the closure if the fuel-dispensing nozzle has the first diameter.

13. A fuel-dispensing nozzle inhibitor comprising a nozzle conduit positionable on a fuel fill tube, wherein the fuel fill tube is constructed to direct fuel to a fuel tank, and wherein the nozzle conduit defines a nozzle-receiving passageway for receiving a fuel-dispensing nozzle with at least one of a first diameter selected for a first fuel type and a second diameter for a second fuel type, the second diameter being smaller than the first diameter, a closure positioned adjacent to a bottom portion of the nozzle conduit, wherein the closure has an opened position to permit insertion of the fuel-dispensing nozzle past the closure if the fuel-dispensing nozzle has the first diameter, and wherein the closure has a closed position to prevent insertion of the fuel-dispensing nozzle past the closure if the fuel-dispensing nozzle has the second diameter, a lock to retain the closure in a closed position if the fuel-dispensing nozzle has the second diameter and to release the closure if the fuel-dispensing nozzle has the first diameter, and lock opening means for actuating the lock, wherein the lock opening means is disposed within the nozzle conduit, wherein the lock opening means is adapted to contact the fuel-dispensing nozzle when inserted into the nozzle-receiving passageway, wherein the lock opening means cooperates with the lock to release the closure if the fuel-dispensing nozzle has the first diameter, and wherein the lock opening means cooperates with the lock to maintain the lock in the closed position if the fuel-dispensing nozzle has the second diameter, wherein the lock opening means comprises actuators that comprise push heads and push-head drivers, the push heads contact one another and form a circular ring when the lock locks the closure in the closed position, and the push-head drivers extend radially inwardly from an interior surface of the push heads and are adapted to contact a fuel-dispensing nozzle having the first diameter, wherein the lock comprises a variable-circumference band, operable with the lock opening means and the closure, to bias the lock to retain the closure in the closed position and permit release of the closure if the fuel-dispensing nozzle has the first diameter, wherein the variable-circumference band is a circular band comprising spring material that surrounds the lock opening means and comprises first and second blockers, the first and second blockers engage the closure when in the closed position, and the first and second blockers release the closure when in the opened position.

14. The fuel-dispensing nozzle inhibitor of claim 1, wherein the fuel fill tube is capless.

15. The fuel-dispensing nozzle inhibitor of claim 1, wherein the first diameter is greater than or equal to about 23.5 mm and the second diameter is less than or equal to about 21.5 mm.

16. A fuel-dispensing nozzle inhibitor comprising a nozzle conduit positionable on a fuel fill tube, wherein the fuel fill tube is constructed to direct fuel to a fuel tank, and wherein the nozzle conduit defines a nozzle-receiving passageway for receiving a fuel-dispensing nozzle with at least one of a first diameter selected for a first fuel type and a second diameter for a second fuel type, the second diameter being smaller than the first diameter, a closure positioned adjacent to a bottom portion of the nozzle conduit, wherein the closure has an opened position to permit insertion of the fuel-dispensing nozzle past the closure if the fuel-dispensing nozzle has the first diameter, and wherein the closure has a closed position to prevent insertion of the fuel-dispensing nozzle past the closure if the fuel-dispensing nozzle has the second diameter, a lock to retain the closure in a closed position if the fuel-dispensing nozzle has the second diameter and to release the closure if the fuel-dispensing nozzle has the first diameter, and lock opening means for actuating the lock, wherein the lock opening means is disposed within the nozzle conduit, wherein the lock opening means is adapted to contact the fuel-dispensing nozzle when inserted into the nozzle-receiving passageway, wherein the lock opening means cooperates with the lock to release the closure if the fuel-dispensing nozzle has the first diameter, and wherein the lock opening means cooperates with the lock to maintain the lock in the closed position if the fuel-dispensing nozzle has the second diameter, wherein the lock opening means comprises actuators that comprise push heads and push-head drivers, the push heads contact one another and form a circular ring when the lock locks the closure in the closed position, and the push-head drivers extend radially inwardly from an interior surface of the push heads and are adapted to contact a fuel-dispensing nozzle having the first diameter, wherein the lock comprises a variable-circumference band, operable with the lock opening means and the closure, to bias the lock to retain the closure in the closed position and permit release of the closure if the fuel-dispensing nozzle has the first diameter, wherein the variable-circumference band has end portions that overlap when the lock is in the closed position.

17. The fuel-dispensing nozzle inhibitor of claim 1, wherein the lock comprises separate band movers disposed in an annular arrangement within the nozzle conduit, and the separate band movers are adapted to move away from each other when moving from the closed position to the opened position.

18. A fuel-dispensing nozzle inhibitor comprising a nozzle conduit positionable on a fuel fill tube, wherein the fuel fill tube is constructed to direct fuel to a fuel tank, and wherein the nozzle conduit defines a nozzle-receiving passageway for receiving a fuel-dispensing nozzle with at least one of a first diameter selected for a first fuel type and a second diameter for a second fuel type, the second diameter being smaller than the first diameter, a closure positioned adjacent to a bottom portion of the nozzle conduit, wherein the closure has an opened position to permit insertion of the fuel-dispensing nozzle past the closure if the fuel-dispensing nozzle has the first diameter, and wherein the closure has a closed position to prevent insertion of the fuel-dispensing nozzle past the closure if the fuel-dispensing nozzle has the second diameter, a lock to retain the closure in a closed position if the fuel-dispensing nozzle has the second diameter and to release the closure if the fuel-dispensing nozzle has the first diameter, and lock opening means for actuating the lock, wherein the lock opening means is disposed within the nozzle conduit, wherein the lock opening means is adapted to contact the fuel-dispensing nozzle when inserted into the nozzle-receiving passageway, wherein the lock opening means cooperates with the lock to release the closure if the fuel-dispensing nozzle has the first diameter, and wherein the lock opening means cooperates with the lock to maintain the lock in the closed position if the fuel-dispensing nozzle has the second diameter, further comprising a guide housing disposed within the nozzle conduit to retain the lock opening means in radially slidable orientation with respect to the nozzle conduit, wherein the separate band movers are disposed in an annular arrangement within the nozzle conduit and include guide posts, and the guide housing comprises slots that cooperate with the guide posts to guide the separate band movers move away from each other from the closed position to the opened position.

19. The fuel-dispensing nozzle inhibitor of claim 17, wherein in the opened position, the separate band movers comprise an annular circumferential arrangement with narrow spaces between the separate band movers, and the separate band movers are arranged to extend along the majority of the annular circumference with the narrow spaces comprising a relatively small portion of the circumference.

20. A filler neck closure assembly associated with a vehicle fuel tank filler neck, the assembly comprising inhibitor means for preventing insertion of a small-diameter unleaded fuel-dispensing pump nozzle into a fuel-conducting passageway formed in a filler neck coupled to a vehicle fuel tank while allowing insertion of a large-diameter diesel fuel-dispensing pump nozzle into the fuel-conducting passageway formed in the filler neck, the inhibitor means including a nozzle conduit formed in the fill tube and formed to include a nozzle-receiving passageway, a flapper door mounted for movement relative to the nozzle conduit to open and close the nozzle-receiving passageway, and a flapper-door anchor coupled to the nozzle conduit and associated with the flapper door, and wherein the flapper-door anchor includes a hoop-shaped flapper door lock and a multi-part lock opener coupled to the nozzle conduit and to the hoop-shaped flapper door lock, wherein the hoop-shaped flapper door lock includes a variable-circumference band that is expandable to change from a normal narrow-diameter mode characterized by a first diameter and circumference to a large-diameter mode characterized by a relatively larger second diameter and circumference, a first door-motion blocker coupled to a first end portion of the variable-circumference band, and a second door-motion blocker coupled to a second end portion of the variable-circumference band and arranged normally to cooperate with the first door-motion blocker to assume a drawn-together formation to trap the flapper door therebetween when the variable-circumference band assumes the narrow-diameter mode to retain the flapper door in a closed position closing the nozzle-receiving aperture, wherein the multi-part lock opener includes several band movers located in an interior region formed in the variable-circumference band and arranged to lie along an interior surface of the variable-circumference band in spaced relation to one another, and wherein the band movers cooperate to move relative to the variable-circumference band and to one another to expand the diameter and circumference of the variable-circumference band to assume the large-diameter mode and move the first and second door-motion blockers away from one another to assume a spread-apart formation disengaging the flapper door so as to release the flapper door in response to movement of the large-diameter fuel-dispensing nozzle through the nozzle-receiving passageway formed in the nozzle conduit to engage the band movers and move the band movers in radially outward directions to expand the variable-circumference band.

21. The assembly of claim 20, wherein the variable-circumference band is coiled normally to assume the narrow-diameter mode owing to elasticity of spring material formed to make the variable-circumference band, the variable-circumference band in the narrow-diameter mode is arranged to urge the band movers to move in radially inward directions toward a central axis passing through a space bounded by the variable-circumference band, each band mover is arranged in the space to contact a large-diameter fuel-dispensing nozzle moving through the space and to move radially outwardly away from the central axis to expand the variable-circumference band to cause the variable-circumference band to move from the narrow-diameter mode to assume the large-diameter mode, and the band movers are arranged in a spread pattern to cause at least some of the band movers to avoid contact with a small-diameter fuel-dispensing nozzle moving through the space to block expansion of the variable-circumference band so as to cause the variable-circumference band to remain in the narrow-diameter mode in response to movement of the small-diameter fuel-dispensing nozzle along the central axis and through the space.

22. The assembly of claim 21, wherein each band mover is arc-shaped and the variable-circumference band is arranged to apply a radially inwardly directed force to each band mover normally to arrange the band movers in a packed relationship forming a circle and causing ends of adjacent band movers to touch when the variable-circumference band assumes the narrow-diameter mode.

23. The assembly of claim 22, wherein each band mover includes an actuator and a guide coupled to the actuator and arranged to extend into and move back and forth in a slot formed in the nozzle conduit during movement of the actuator relative to the nozzle conduit in response to a force applied to the actuator by a large-diameter fuel-dispensing nozzle moving along the central axis and in the space.

24. The assembly of claim 23, wherein the guide includes a lower guide post coupled to a bottom of the actuator and arranged to extend in a first direction away from the actuator into a companion first slot formed in the nozzle conduit and an upper guide post coupled to a top of the actuator and arranged to extend in an opposite second direction away from the actuator into a companion second slot formed in the nozzle conduit.

25. The assembly of claim 23, wherein the actuator includes a push-head driver formed to include a sloped ramp arranged to provide means for engaging a tip of a moving large-diameter fuel-dispensing nozzle moving downwardly along the central axis through the space, the push-head driver is arranged to move radially outwardly away from the central axis in response to application of an external force to the sloped ramp by the moving large-diameter fuel-dispensing nozzle, the actuator further includes a push head including an exterior wall arranged to confront the interior surface of the variable-circumference band and an interior wall arranged to face toward the central axis, and the push-head driver is coupled to the interior wall of the push head to urge the push head to move away from the central axis to apply an expansion force to the interior surface variable-circumference band to expand the variable-circumference band to assume the large-diameter mode in response to radially outward movement of the push-head driver.

26. The assembly of claim 20, wherein the flapper door includes a pivot mount, a door tongue, and a door plate arranged to interconnect the pivot mount and the door tongue, the pivot mount is coupled to the nozzle conduit to support the flapper door for pivotable movement about a pivot axis between the opened and closed positions, and the first and second door-motion blockers cooperate in the drawn-together formation to mate with and restrain the door tongue when the flapper door is in the closed position to block pivotable movement of the flapper door from the closed position toward an opened position.

27. The assembly of claim 26, wherein the variable-circumference band is made of an elastic material configured normally to establish variable-circumference band in the narrow-diameter mode, includes a curved strip having the first and second end portions, and the first and second end portions are arranged to lie in side-by-side relation to one another to move relative to one another in slip-sliding relation during change of the variable-circumference band between the narrow-diameter mode and the large-diameter mode.

28. The assembly of claim 27, wherein each of the first and second door-motion blockers is L-shaped and includes a downwardly extending blade cantilevered to the variable-circumference band and an inwardly extending latch finger coupled to a free end of a companion downwardly extending blade, the inwardly extending latch finger of the first door-motion blocker extends in a first direction, and the inwardly extending latch finger of the second door-motion blocker extends in an opposite second direction toward the inwardly extending latch finger of the first door-motion blocker.

29. The assembly of claim 28, wherein the flapper door is formed to include a downwardly opening lug receiver channel and the hoop-shaped flapper door lock further includes a first retainer lug coupled to the first door-motion blocker and arranged to extend upwardly toward the downwardly opening lug receiver channel.

30. The assembly of claim 28, wherein the door tongue extends into a space bordered in part by the first and second end portions of the variable-circumference band, spaced-apart portions of the downwardly extending blades of the first and second door-motion blockers, and end-to-end portions of the first and second door-motion blockers.

31. The assembly of claim 27, wherein the hoop-shaped flapper door lock further includes an anti-rotation tab coupled to the curved strip of the variable-circumference band and arranged to extend into a channel formed in the nozzle conduit to provide means for blocking an operator from using an unauthorized fuel-dispensing nozzle to pull on one of the first and second door-motion blockers more than another of the first and second door-motion blockers in an attempt to unlock the hoop-shaped flapper door lock by separating the first and second door-motion blockers from the door tongue of the flapper door.

32. The assembly of claim 26, wherein the flapper door further includes a pair of upstanding band-mover guards coupled to the door plate and arranged to extend upwardly toward a fuel-dispensing nozzle moving through the nozzle-receiving passageway toward the door plate and the pair of upstanding band-mover guards is formed to include a channel therebetween to receive a nose portion of one of the push-head drivers when the variable-circumference band has assumed the narrow-diameter mode.

33. The assembly of claim 32, wherein the flapper door includes several more pairs of upstanding band-mover guards coupled to the door plate and arranged to extend upwardly toward a fuel-dispensing nozzle moving through the nozzle-receiving passageway toward the door plate and the pairs of upstanding band-mover guards cooperate to define means for blocking movement of a small-diameter fuel-dispensing nozzle in the space formed in the variable-circumference band to cause all of the band movers to move in radially outward directions to expand the circumference of the variable-circumference band and thus unlock the hoop-shaped flapper door lock by separating the first and second door-motion blockers from the door tongue of the flapper door.

34. The assembly of claim 20, further comprising an inhibitor housing adapted to be coupled to an outer end of a filler neck and formed to include floater means for supporting the nozzle conduit for lateral floating movement in an interior region of the fill tube relative to the fill tube to block unauthorized attempts by an operator to use a small-diameter fuel-dispensing nozzle to unlock a normally locked flapper door to regulate admission of fuel-dispensing nozzles through the fill tube and the nozzle-receiving aperture formed in the wall of the fill tube.

35. The assembly of claim 34, wherein the nozzle conduit includes a support flange, the inhibitor housing is formed to include an interior region and a flange-receiving space opening into the interior region of the inhibitor housing and defining the floater means, and the support flanges extend into the flange-receiving space to allow lateral floating movement of the nozzle conduit in the interior region of the inhibitor housing during unauthorized attempts to use a small-diameter fuel-dispensing nozzle to unlock the normally locked flapper door.

36. The assembly of claim 35, wherein the inhibitor housing includes a base adapted to be coupled to an outer end of a filler neck and formed to include the interior region of the inhibitor housing and a crown coupled to an outer portion of the base to form the flange-receiving space therebetween.

37. The assembly of claim 36, wherein the crown includes an interior block located in spaced-apart relation to the base to define the flange-receiving space therebetween and an outer shell arranged to surround and mate with the interior block and coupled to the base to retain the interior block in a stationary position relative to the base.

38. The assembly of claim 35, wherein the nozzle conduit further includes a carrier shell and a guide housing coupled to the carrier shell to move therewith in the interior region of the inhibitor housing, the flapper door is coupled to the guide housing, and the carrier shell is formed to include the support flange.

39. The assembly of claim 38, wherein the carrier shell includes a housing mount coupled to the support flange and to the guide housing.

40. A filler neck closure assembly associated with a vehicle fuel tank filler neck, the assembly comprising inhibitor means for preventing insertion of a small-diameter unleaded fuel-dispensing pump nozzle into a fuel-conducting passageway formed in a filler neck coupled to a vehicle fuel tank while allowing insertion of a large-diameter diesel fuel-dispensing pump nozzle into the fuel-conducting passageway formed in the filler neck, the inhibitor means including a nozzle conduit formed in the fill tube and formed to include a nozzle-receiving passageway, a flapper door mounted for movement relative to the nozzle conduit to open and close the nozzle-receiving passageway, and a flapper-door anchor coupled to the nozzle conduit and associated with the flapper door, and wherein the flapper-door anchor includes a hoop-shaped flapper door lock and wherein the hoop-shaped flapper door lock includes a variable-circumference band that is expandable to change from a normal narrow-diameter mode characterized by a first diameter and circumference to a large-diameter mode characterized by a relatively larger second diameter and circumference, a first door-motion blocker coupled to a first end portion of the variable-circumference band, and a second door-motion blocker coupled to a second end portion of the variable-circumference band and arranged normally to cooperate with the first door-motion blocker to assume a drawn-together formation to trap the flapper door therebetween when the variable-circumference band assumes the narrow-diameter mode to retain the flapper door in a closed position closing the nozzle-receiving aperture.

41. The assembly of claim 40, wherein the flapper door includes a pivot mount, a door tongue, and a door plate arranged to interconnect the pivot mount and the door tongue, the pivot mount is coupled to the nozzle conduit to support the flapper door for pivotable movement about a pivot axis between the opened and closed positions, and the first and second door-motion blockers cooperate in the drawn-together formation to mate with and restrain the door tongue when the flapper door is in the closed position to block pivotable movement of the flapper door from the closed position toward an opened position.

42. The assembly of claim 41, wherein the flapper door is formed to include a downwardly opening lug receiver channel and the hoop-shaped flapper door lock further includes a first retainer lug coupled to the first door-motion blocker and arranged to extend upwardly toward the downwardly opening lug receiver channel.

43. The assembly of claim 41, wherein the variable-circumference band is made of an elastic material configured normally to establish variable-circumference band in the narrow-diameter mode, includes a curved strip having the first and second end portions, and the first and second end portions are arranged to lie in side-by-side relation to one another to move relative to one another in slip-sliding relation during change of the variable-circumference band between the narrow-diameter mode and the large-diameter mode.

44. The assembly of claim 43, wherein each of the first and second door-motion blockers is L-shaped and includes a downwardly extending blade cantilevered to the variable-circumference band and an inwardly extending latch finger coupled to a free end of a companion downwardly extending blade, the inwardly extending latch finger of the first door-motion blocker extends in a first direction, and the inwardly extending latch finger of the second door-motion blocker extends in an opposite second direction toward the inwardly extending latch finger of the first door-motion blocker.

45. The assembly of claim 44, wherein the flapper door is formed to include a downwardly opening lug receiver channel, the hoop-shaped flapper door lock further includes a first retainer lug coupled to the first door-motion blocker and arranged to extend upwardly toward the downwardly opening lug receiver channel, the first retainer lug is coupled to a free end of the inwardly extending latch flinger of the first door-motion blocker, and the second retainer lug is coupled to a free end of the inwardly extending latch finger of the second door-motion blocker.

46. The assembly of claim 43, wherein the hoop-shaped flapper door lock further includes an anti-rotation tab coupled to the curved strip of the variable-circumference band and arranged to extend into a channel formed in the nozzle conduit to provide means for blocking an operator from using an unauthorized fuel-dispensing nozzle to pull on one of the first and second door-motion blockers more than another of the first and second door-motion blockers in an attempt to unlock the hoop-shaped flapper door lock by separating the first and second door-motion blockers from the door tongue of the flapper door.

47. A fuel-dispensing nozzle inhibitor comprising a nozzle conduit positionable on a fuel fill tube, wherein the fuel fill tube is constructed to direct fuel to a fuel tank, and wherein the nozzle conduit defines a nozzle-receiving passageway for receiving a fuel-dispensing nozzle with at least one of a first diameter selected for a first fuel type and a second diameter for a second fuel type, the second diameter being smaller than the first diameter, a closure positioned adjacent to a bottom portion of the nozzle conduit, wherein the closure has an opened position to permit insertion of the fuel-dispensing nozzle past the closure if the fuel-dispensing nozzle has the first diameter, and wherein the closure has a closed position to prevent insertion of the fuel-dispensing nozzle past the closure if the fuel-dispensing nozzle has the second diameter, a lock comprising a variable-circumference band that retains the closure in a closed position if the fuel-dispensing nozzle has the second diameter and releases the closure if the fuel-dispensing nozzle has the first diameter, and a plurality of independently operable actuators within the nozzle conduit, wherein the actuators are adapted to contact the fuel-dispensing nozzle when inserted into the nozzle-receiving passageway, wherein the actuators cooperate with the lock to release the closure if the fuel-dispensing nozzle has the first diameter, and wherein the actuators cooperate with the lock to maintain the lock in the closed position if the fuel-dispensing nozzle has the second diameter.

48. The fuel-dispensing nozzle inhibitor of claim 47, wherein the closure is a flapper door pivotably disposed adjacent to the bottom portion of the nozzle conduit.

49. The fuel-dispensing nozzle of claim 48, wherein the closure further includes a return spring that operates with the flapper door to bias the flapper door into the closed position and to permit the flapper door to be pushed into the opened position when the fuel-dispensing nozzle applies an opening force on the flapper door, and a door tongue, included in the flapper door, that cooperates with the lock such that the door tongue is retained in the lock when the flapper door is in the closed position and is released from the lock when the flapper door is in the opened position.

50. The fuel-dispensing nozzle inhibitor of claim 49, wherein the flapper door further includes a pivot mount and a door plate arranged to interconnect the pivot mount and the door tongue, the return spring has a coiled portion, a first leg engaging the nozzle conduit, and a second leg engaging the pivot mount of the flapper door, and the door tongue is cantilevered to the door plate and arranged to extend in a direction away from the pivot mount.

51. The fuel-dispensing nozzle inhibitor of claim 47, wherein the lock comprises a variable-circumference band, operable with the actuators and the closure, to bias the lock to retain the closure in the closed position and permit release of the closure if the fuel-dispensing nozzle has the first diameter.

52. The fuel-dispensing nozzle inhibitor of claim 47, wherein the actuators are slidably mounted within the nozzle conduit and move in a radial direction with respect to a centerline of the nozzle conduit.

53. The fuel-dispensing nozzle inhibitor of claim 51, wherein the variable-circumference band is a band spring that surrounds the actuators and comprises first and second blockers, the blockers engage the closure when in the closed position, and the blockers release the closure when in the opened position.

54. The fuel-dispensing nozzle inhibitor of claim 47, wherein each of the actuators includes a push-head driver, and the push-head drivers are substantially, equidistantly spaced with respect to one another in the nozzle conduit.

55. The fuel-dispensing nozzle of claim 54, wherein, to release the closure, a majority of the push-head drivers must contact the fuel-dispensing nozzle.

56. The fuel-dispensing nozzle of claim 55, wherein the majority of the push-head drivers comprises all of the push-head drivers.

57. The fuel-dispensing nozzle inhibitor of claim 47, wherein the fuel fill tube is capless.

58. The fuel-dispensing nozzle inhibitor of claim 47, wherein the first diameter is greater than or equal to about 23.5 mm and the second diameter is less than or equal to about 21.5 mm.

59. A fuel-dispensing nozzle inhibitor comprising a nozzle conduit positionable on a fuel fill tube, wherein the fuel fill tube is constructed to direct fuel to a fuel tank, and wherein the nozzle conduit defines a nozzle-receiving passageway for receiving a fuel-dispensing nozzle with at least one of a first diameter selected for a first fuel type and a second diameter for a second fuel type, the second diameter being smaller than the first diameter, a closure positioned adjacent to a bottom portion of the nozzle conduit, wherein the closure has an opened position to permit insertion of the fuel-dispensing nozzle past the closure if the fuel-dispensing nozzle has the first diameter, and wherein the closure has a closed position to prevent insertion of the fuel-dispensing nozzle past the closure if the fuel-dispensing nozzle has the second diameter, a lock that retains the closure in a closed position if the fuel-dispensing nozzle has the second diameter and releases the closure if the fuel-dispensing nozzle has the first diameter, and a plurality of independently operable actuators within the nozzle conduit, wherein the actuators are adapted to contact the fuel-dispensing nozzle when inserted into the nozzle-receiving passageway, wherein the actuators cooperate with the lock to release the closure if the fuel-dispensing nozzle has the first diameter, and wherein the actuators cooperate with the lock to maintain the lock in the closed position if the fuel-dispensing nozzle has the second diameter, wherein the lock comprises a variable-circumference band, operable with the actuators and the closure, to bias the lock to retain the closure in the closed position and permit release of the closure if the fuel-dispensing nozzle has the first diameter, and wherein the variable-circumference band has end portions that overlap when the lock is in the closed position.

60. The fuel-dispensing nozzle inhibitor of claim 47, wherein the lock comprises separate band movers disposed in an annular arrangement within the nozzle conduit, and the separate band movers are adapted to move away from each other when moving from the closed position to the opened position.

61. A fuel-dispensing nozzle inhibitor comprising a nozzle conduit positionable on a fuel fill tube, wherein the fuel fill tube is constructed to direct fuel to a fuel tank, and wherein the nozzle conduit defines a nozzle-receiving passageway for receiving a fuel-dispensing nozzle with at least one of a first diameter selected for a first fuel type and a second diameter for a second fuel type, the second diameter being smaller than the first diameter, a closure positioned adjacent to a bottom portion of the nozzle conduit, wherein the closure has an opened position to permit insertion of the fuel-dispensing nozzle past the closure if the fuel-dispensing nozzle has the first diameter, and wherein the closure has a closed position to prevent insertion of the fuel-dispensing nozzle past the closure if the fuel-dispensing nozzle has the second diameter, a lock that retains the closure in a closed position if the fuel-dispensing nozzle has the second diameter and releases the closure if the fuel-dispensing nozzle has the first diameter, and a plurality of independently operable actuators within the nozzle conduit, wherein the actuators are adapted to contact the fuel-dispensing nozzle when inserted into the nozzle-receiving passageway, wherein the actuators cooperate with the lock to release the closure if the fuel-dispensing nozzle has the first diameter, wherein the actuators cooperate with the lock to maintain the lock in the closed position if the fuel-dispensing nozzle has the second diameter, separate band movers disposed in an annular arrangement within the nozzle conduit, and the separate band movers are adapted to move away from each other when moving from the closed position to the opened position, wherein the separate band movers include guide posts, and the guide housing comprises slots that cooperate with the guide posts to guide the separate band movers move away from each other from the closed position to the opened position.

62. The fuel-dispensing nozzle inhibitor of claim 60, wherein, in the opened position, the separate band movers comprise an annular circumferential arrangement with narrow spaces between the separate band movers, the separate band movers extending along the majority of the annular circumference with the narrow spaces comprising a relatively small portion of the circumference.

63. A filler neck closure assembly associated with a vehicle fuel tank filler neck, the assembly comprising inhibitor means for preventing insertion of a small-diameter unleaded fuel-dispensing pump nozzle into a fuel-conducting passageway formed in a filler neck coupled to a vehicle fuel tank while allowing insertion of a large-diameter diesel fuel-dispensing pump nozzle into the fuel-conducting passageway formed in the filler neck, the inhibitor means including a nozzle conduit formed in the fill tube and formed to include a nozzle-receiving passageway, a flapper door mounted for movement relative to the nozzle conduit to open and close the nozzle-receiving passageway, and a flapper-door anchor coupled to the nozzle conduit and associated with the flapper door, and wherein the flapper-door anchor includes a hoop-shaped flapper door lock and a multi-part lock opener coupled to the nozzle conduit and to the hoop-shaped flapper door lock, wherein the hoop-shaped flapper door lock includes a variable-circumference band that is expandable to change from a normal narrow-diameter mode characterized by a first diameter and circumference to a large-diameter mode characterized by a relatively larger second diameter and circumference, a first door-motion blocker coupled to a first end portion of the variable-circumference band, and a second door-motion blocker coupled to a second end portion of the variable-circumference band and arranged normally to cooperate with the first door-motion blocker to assume a drawn-together formation to trap the flapper door therebetween when the variable-circumference band assumes the narrow-diameter mode to retain the flapper door in a closed position closing the nozzle-receiving aperture, wherein the multi-part lock opener includes several band movers located in an interior region formed in the variable-circumference band and arranged to lie along an interior surface of the variable-circumference band, and wherein the band movers cooperate to move relative to the variable-circumference band and to one another to expand the diameter and circumference of the variable-circumference band to assume the large-diameter mode and move the first and second door-motion blockers away from one another to assume a spread-apart formation disengaging the flapper door so as to release the flapper door in response to movement of the large-diameter fuel-dispensing nozzle through the nozzle-receiving passageway formed in the nozzle conduit to engage the band movers and move the band movers in radially outward directions to expand the variable-circumference band.

*64. A filler neck closure assembly associated with a vehicle fuel tank filler neck, the assembly comprising*

*a nozzle inhibitor configured to prevent insertion of a small-diameter unleaded fuel-dispensing pump nozzle into a fuel-conducting passageway formed in a filler neck coupled to a vehicle fuel tank while allowing insertion of a large-diameter diesel fuel-dispensing pump nozzle into the fuel-conducting passageway formed in the filler neck, the nozzle inhibitor including a nozzle conduit formed to include a nozzle-receiving passageway, a door mounted for movement relative to the nozzle conduit to open and close the nozzle-receiving passageway, and a door anchor coupled to the nozzle conduit and associated with the door, and*

*an inhibitor housing formed to include an interior region receiving the nozzle inhibitor and means for supporting the nozzle conduit for lateral floating movement in the interior region of the inhibitor housing relative to the inhibitor housing to block unauthorized attempts by an operator to use a small-diameter fuel-dispensing nozzle to unlock a normally locked door to regulate admission of fuel-dispensing nozzles through the filler neck and the nozzle-receiving aperture formed in the wall of the filler neck, wherein the means for supporting the nozzle conduit provides a flange-receiving space surrounding the interior region of the inhibitor housing.*

*65. The assembly of claim 64, wherein the nozzle conduit includes a support flange and the support flange extends into the flange-receiving space provided by the means for supporting the nozzle conduit to allow lateral floating movement of the nozzle conduit in the interior region of the inhibitor housing.*

*66. The assembly of claim 65, wherein the inhibitor housing includes a base formed to define at least a portion the interior region of the inhibitor housing and a crown coupled to an outer portion of the base and the means for supporting the nozzle conduit includes a surface provided on the base and a surface provided on the crown and arranged to cooperate with the surface provided on the base to form a boundary of the flange-receiving space.*

*67. The assembly of claim 66, wherein the crown includes an interior block and an outer shell, the surface provided on the crown is included in the outer shell, and the means for supporting the nozzle conduit further includes a surface provided on the interior block and arranged to lie above and in spaced-apart relation to the surface provided on the base.*

*68. The assembly of claim 64, wherein the door anchor includes a hoop-shaped door lock and a lock opener coupled to the nozzle conduit and to the hoop-shaped door lock.*

*69. The assembly of claim 68, wherein the hoop-shaped door lock includes an expandable band that is expandable to change from a normal narrow-diameter mode characterized by a first diameter to a large-diameter mode characterized by a relatively larger second diameter, a first door-motion blocker coupled to a first end portion of the expandable band, and a second door-motion blocker coupled to a second end portion of the expandable band and arranged normally to*

*cooperate with the first door-motion blocker to assume a drawn-together formation to trap the door therebetween when the expandable band assumes the narrow-diameter mode to retain the door in a closed position closing the nozzle-receiving aperture.*

*70. The assembly of claim 69, wherein the lock opener includes several band movers located in an interior region formed in the expandable band and arranged to lie along an interior surface of the expandable band in spaced-apart relation to one another.*

*71. The assembly of claim 70, wherein the band movers cooperate to move relative to the expandable band and to one another to expand the diameter of the expandable band to assume the large-diameter mode and move the first and second door-motion blockers away from one another to assume a spread-apart formation disengaging the door so as to release the door in response to movement of the large-diameter fuel-dispensing nozzle through the nozzle-receiving passageway formed in the nozzle conduit to engage the band movers and move the band movers in radially outward directions to expand the expandable band.*

*72. A filler neck closure assembly associated with a vehicle fuel tank filler neck, the assembly comprising*

*a nozzle inhibitor configured to prevent insertion of a small-diameter unleaded fuel-dispensing pump nozzle into a fuel-conducting passageway formed in a filler neck coupled to a vehicle fuel tank while allowing insertion of a large-diameter diesel fuel-dispensing pump nozzle into the fuel-conducting passageway, the nozzle inhibitor including a nozzle conduit formed to include a nozzle-receiving passageway, a door mounted for movement relative to the nozzle conduit to open and close the nozzle-receiving passageway, and a door anchor coupled to the nozzle conduit and associated with the door, and wherein the door anchor includes a hoop-shaped door lock and the hoop-shaped door lock includes a band that is expandable to change from a normal narrow-diameter mode characterized by a first diameter to a large-diameter mode characterized by a relatively larger second diameter, a first door-motion blocker coupled to a first end portion of the band, and a second door-motion blocker coupled to a second end portion of the band and arranged normally to cooperate with the first door-motion blocker to assume a drawn-together formation to trap the door therebetween when the band assumes the narrow-diameter mode to retain the door in a closed position closing the nozzle-receiving aperture,*

*wherein the door includes a pivot mount, a door tongue, and a door plate arranged to interconnect the pivot mount and the door tongue, the pivot mount is coupled to the nozzle conduit to support the door for pivotable movement about a pivot axis between the opened and closed positions, and the first and second door-motion blockers cooperate in the drawn-together formation to mate with and restrain the door tongue when the door is in the closed position to block pivotable movement of the door from the closed position toward an opened position, and*

*wherein the door is formed to include a channel and the hoop-shaped door lock further includes a first lug coupled to the first door-motion blocker and arranged to extend upwardly toward the channel.*

*73. The assembly of claim 72, wherein each of the first and second door-motion blockers is L-shaped and includes a downwardly extending blade cantilevered to the band and an inwardly extending latch finger coupled to a free end of a companion downwardly extending blade, the inwardly extending latch finger of the first door-motion blocker extends in a first direction, and the inwardly extending latch finger of the second door-motion blocker extends in an opposite second direction toward the inwardly extending latch finger of the first door-motion blocker.*

*74. The assembly of claim 73, wherein the first lug is coupled to a free end of the inwardly extending latch finger of the first door-motion blocker and is arranged to extend upwardly into the channel.*

*75. The assembly of claim 74, wherein the hoop-shaped door lock further includes a second lug coupled to the second door-motion blocker and arranged to extend upwardly into the channel, and the second lug is coupled to a free end of the inwardly extending latch finger of the second door-motion blocker.*

*76. A filler neck closure assembly associated with a vehicle fuel tank filler neck, the assembly comprising*

*an inhibitor housing including a base formed to include an aperture extending around an axis, an interior block formed to include a first opening extending around the axis, and a shell coupled to the base and to the interior block to hold the interior block relative to the base so that the first opening formed in the block is spaced apart from the aperture formed in the base along the axis to define a receiving space between the base and the interior block, the receiving space being arranged to extend around the aperture formed in the base and the first opening being formed in the interior block, and*

*a nozzle inhibitor including a nozzle conduit formed to include a nozzle-receiving passageway and a closure mounted for movement relative to the nozzle conduit to open and close the nozzle-receiving passageway,*

*wherein the nozzle conduit includes a side wall arranged to extend at least partway around the nozzle-receiving passageway and a support member arranged to lie radially outward of the side wall and arranged to lie in the receiving space between the base and the interior block to allow floating movement of the nozzle inhibitor radially relative to the inhibitor housing.*

*77. The assembly of claim 76, wherein the base includes a first wall formed to include the aperture and a second wall spaced apart from the aperture and arranged to extend from the first wall along the axis to define an interior region of the base and at least a portion of the nozzle inhibitor is arranged to lie in the interior region of the base.*

*78. The assembly of claim 77, wherein the interior block is formed to include a second opening larger than the first opening and a funnel-shaped nozzle guide surface arranged to extend from the first opening to the second opening to define an interior passageway extending between the first opening and the second opening.*

*79. The assembly of claim 76, wherein the closure includes a door coupled to the nozzle conduit to pivot relative to the nozzle conduit and a return spring coupled to the door and to the nozzle conduit.*

*80. The assembly of claim 79, wherein the nozzle inhibitor includes a door lock including an expandable band that is expandable to change from a normal narrow-diameter mode characterized by a first diameter to a large-diameter mode characterized by a relatively larger second diameter, a first door-motion blocker, and a second door-motion blocker and arranged normally to cooperate with the first door-motion blocker to assume a drawn-together formation to trap the door therebetween when the expandable band assumes the narrow-diameter mode to retain the door in a closed position closing the nozzle-receiving aperture.*

*81. The assembly of claim 80, wherein the door is formed to include a channel and the door lock further includes a first lug coupled to the first door-motion blocker and arranged to extend upwardly toward the channel and a second lug coupled to the second door-motion blocker and arranged to extend upwardly toward the channel.*

*82. The assembly of claim 81, wherein the first lug and the second lug extend into the channel.*

*83. A filler neck closure assembly associated with a vehicle fuel tank filler neck, the assembly comprising*

*an inhibitor housing including a base formed to include an aperture arranged to receive an axis, an interior block formed to include a first opening arranged to receive the axis, and a shell coupled to the base and to the interior block to hold the interior block relative to the base so that the first opening formed in the interior block is spaced apart from the aperture formed in the base along the axis to define a receiving space between the base and the interior block, the receiving space being arranged radially outward of the aperture and the first opening relative to the axis,*

*a nozzle inhibitor including a nozzle conduit formed to include a nozzle-receiving passageway and a closure mounted for movement relative to the nozzle conduit to open and close the nozzle-receiving passageway, and*

*a support member arranged to lie in the receiving space formed between the base and the interior block and to interact with the inhibitor housing and the nozzle inhibitor to allow floating movement of the nozzle inhibitor radially relative to the inhibitor housing.*

*84. The assembly of claim 83, wherein the base includes a first wall formed to include the aperture and a second wall spaced apart from the aperture and arranged to extend from the first wall along the axis to define an interior region of the base and at least a portion of the nozzle inhibitor is arranged to lie in the interior region of the base.*

*85. The assembly of claim 83, wherein the interior block is formed to include a second opening larger than the first opening and a funnel-shaped nozzle guide surface is arranged to extend from the first opening to the second opening to define an interior passageway extending between the first opening and the second opening.*

*86. A filler neck closure assembly associated with a vehicle fuel tank filler neck, the assembly comprising*

*an inhibitor housing including a base formed to include an aperture extending around an axis, an interior collar formed to include a first opening extending around the axis, and a shell coupled to the base and to the interior collar to hold the interior collar relative to the base so that the first opening formed in the interior collar is spaced apart from the aperture formed in the base along the axis to define a receiving space between the base and the interior collar, the receiving space arranged around the aperture formed in the base and the first opening formed in the interior collar,*

*a nozzle inhibitor including a nozzle conduit formed to include a nozzle-receiving passageway and a closure mounted for movement relative to the nozzle conduit to open and close the nozzle-receiving passageway, and*

*a support member arranged to lie in the receiving space between the base and the interior collar and to interact with the inhibitor housing and the nozzle inhibitor.*

*87. A fuel-dispensing nozzle inhibitor comprising*

*a nozzle conduit adapted for use with a fuel fill tube, wherein the fuel fill tube is constructed to direct fuel to a fuel tank, and wherein the nozzle conduit defines a nozzle-receiving passageway configured to receive a fuel-dispensing nozzle with at least one of a first diameter selected for a first fuel type and a second diameter for a second fuel type, the second diameter being smaller than the first diameter,*

*a closure positioned adjacent to a bottom portion of the nozzle conduit, wherein the closure has an opened position to permit insertion of the fuel-dispensing nozzle past the closure if the fuel-dispensing nozzle has the first diameter, and wherein the closure has a closed position to prevent insertion of the fuel-dispensing nozzle past the closure if the fuel-dispensing nozzle has the second diameter, and*

*a lock configured to retain the closure in a closed position if the fuel-dispensing nozzle has the second diameter and to release the closure if the fuel-dispensing nozzle has the first diameter,*

*wherein the lock comprises an expandable band to bias the lock to retain the closure in the closed position and permit release of the closure if the fuel-dispensing nozzle has the first diameter, a downwardly-extending door-motion blocker, and an upwardly-extending lug coupled to the downwardly-extending door motion blocker.*

*88. A filler neck closure assembly comprising*

*an inhibitor housing including a base formed to include an aperture arranged to receive an axis, a crown formed to include a first opening arranged to receive the axis, the aperture being formed in the base to lie in spaced-apart relation from the first opening formed in the crown along the axis to define a receiving space between the base, and the crown being arranged radially to lie outward of the aperture and the first opening relative to the axis,*

*a nozzle inhibitor including a nozzle conduit formed to include a nozzle-receiving passageway and a closure mounted for movement relative to the nozzle conduit to open and close the nozzle-receiving passageway, and*

*a support member arranged to extend into the receiving space and to interact with the inhibitor housing and the nozzle inhibitor to allow floating movement of the nozzle inhibitor radially relative to the inhibitor housing.*

*89. The filler neck closure assembly of claim 88, wherein the support member is arranged to interact with the inhibitor housing and the nozzle inhibitor to support the nozzle inhibitor in a selected axial position relative to the inhibitor housing.*

*90. The filler neck closure assembly of claim 88, wherein the closure includes a door having a door plate and a door tongue formed to include a channel, and wherein the nozzle inhibitor includes a lock having an expandable band, a first downwardly-extending motion blocker coupled to the expandable band, a second downwardly-extending motion blocker coupled to the expandable band, a first lug extending upwardly from the first downwardly-extending motion blocker into the channel formed in the door tongue, and a second lug extending upwardly from the second downwardly-extending motion blocker into the channel formed in the door tongue.*

*91. The filler neck closure assembly of claim 88, wherein the support member is coupled to the nozzle inhibitor.*

*92. A nozzle inhibitor comprising*

*a nozzle conduit formed to include a nozzle-receiving passageway,*

*a door mounted for movement relative to the nozzle conduit to open and close the nozzle-receiving passageway, the door including a door plate and a door tongue formed to include a channel, and*

*a lock including an expandable band, a first downwardly-extending motion blocker coupled to the expandable*

*band, a second downwardly-extending motion blocker coupled to the expandable band, a first lug extending upwardly from the first downwardly-extending motion blocker toward the channel formed in the door tongue, and a second lug extending upwardly from the second downwardly-extending motion blocker toward the channel formed in the door tongue.*

*93. The nozzle inhibitor of claim 92, wherein the first lug is arranged to extend into the channel formed in the door tongue and the second lug is arranged to extend into the channel formed in the door tongue.*

*94. A filler neck closure assembly comprising*

*a nozzle inhibitor housing formed to include an interior region adapted to receive a fuel-dispensing nozzle and arranged to extend along a vertical axis and communicate with a filler neck coupled to a fuel tank and formed to include a receiving space arranged to surround and communicate with the interior region and*

*a nozzle inhibitor formed to include a nozzle-receiving passageway adapted to receive a fuel-dispensing nozzle and arranged to extend along the vertical axis and communicate with the interior region formed in the nozzle inhibitor housing, wherein the nozzle inhibitor includes a closure arranged normally to close the nozzle-receiving passageway to regulate admission of a fuel-dispensing nozzle through the nozzle-receiving passageway formed in the nozzle inhibitor through the interior region formed in the nozzle inhibitor housing toward a filler neck associated with the nozzle inhibitor housing and the nozzle inhibitor is supported in the receiving space for lateral floating movement in the interior region formed in the nozzle inhibitor housing relative to the vertical axis in response to lateral movement of a fuel-dispensing nozzle in the interior region relative to the vertical axis.*

*95. The assembly of claim 94, wherein the nozzle inhibitor is constrained to lie in a fixed axial position in the nozzle inhibitor housing yet is free to float laterally relative to the nozzle inhibitor housing.*

*96. The assembly of claim 95, wherein the nozzle inhibitor is mounted to float in radially outward and inward directions relative to the vertical axis.*

*97. The assembly of claim 95, wherein the nozzle inhibitor is free to move laterally from a normal centered position in which a center of the nozzle inhibitor is aligned with the vertical axis to an off-center position in which the center of the nozzle inhibitor is separated from the vertical axis.*

*98. The assembly of claim 94, wherein the receiving space is formed between a stationary bottom surface and a stationary top surface and a surrounding outer surface to open toward the vertical axis and is characterized by a predetermined volume.*

* * * * *